United States Patent
Shoji

(10) Patent No.: US 11,843,257 B2
(45) Date of Patent: Dec. 12, 2023

(54) POWER TRANSMISSION APPARATUS AND WIRELESS POWER TRANSMISSION SYSTEM

(71) Applicant: CANON KABUSHIKI KAISHA, Tokyo (JP)

(72) Inventor: Yuki Shoji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 17/039,711

(22) Filed: Sep. 30, 2020

(65) Prior Publication Data
US 2021/0111592 A1 Apr. 15, 2021

(30) Foreign Application Priority Data
Oct. 10, 2019 (JP) .................................. 2019-186618

(51) Int. Cl.
*H02J 50/12* (2016.01)
*H02J 50/70* (2016.01)

(52) U.S. Cl.
CPC .............. *H02J 50/12* (2016.02); *H02J 50/70* (2016.02)

(58) Field of Classification Search
CPC ............. H02J 50/00; H02J 50/12; H02J 50/70
See application file for complete search history.

(56) References Cited

U.S. PATENT DOCUMENTS

| | | | | |
|---|---|---|---|---|
| 11,114,950 B2* | 9/2021 | Hosotani | ............... | H02J 7/0063 |
| 2011/0127953 A1* | 6/2011 | Walley | ................. | H04B 5/0037 |
| | | | | 320/108 |
| 2014/0368056 A1* | 12/2014 | Hosotani | ............. | H04B 5/0037 |
| | | | | 307/104 |
| 2015/0357825 A1* | 12/2015 | Wortel | .................... | H02J 50/90 |
| | | | | 307/104 |
| 2017/0155283 A1* | 6/2017 | Akuzawa | ................ | H02J 50/12 |
| 2018/0097406 A1* | 4/2018 | Chen | ....................... | H02J 50/12 |

FOREIGN PATENT DOCUMENTS

| | | |
|---|---|---|
| JP | 2015104164 A | 6/2015 |
| JP | 5787027 B2 | 9/2015 |
| JP | 2016067135 A | 4/2016 |
| JP | 2018078746 A | 5/2018 |

\* cited by examiner

*Primary Examiner* — Rexford N Barnie
*Assistant Examiner* — Joseph N Inge
(74) *Attorney, Agent, or Firm* — Canon U.S.A., Inc. IP Division

(57) ABSTRACT

A power transmission apparatus includes a first switching element having a first and a second terminal, a first capacitor connected between the first terminal and the second terminal of the first switching element, and a power transmission inductor connected to the first switching element on a direct-current (DC) basis and configured to wirelessly transmit alternating-current (AC) power.

5 Claims, 22 Drawing Sheets

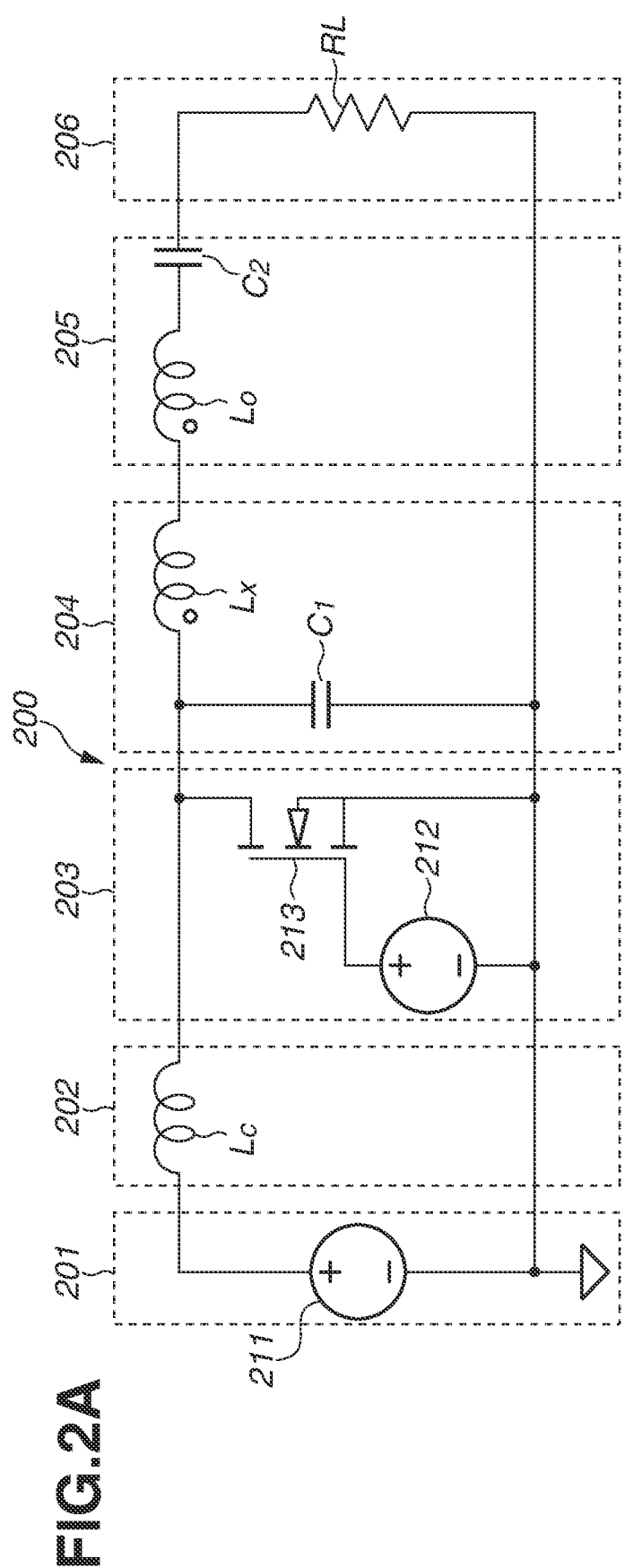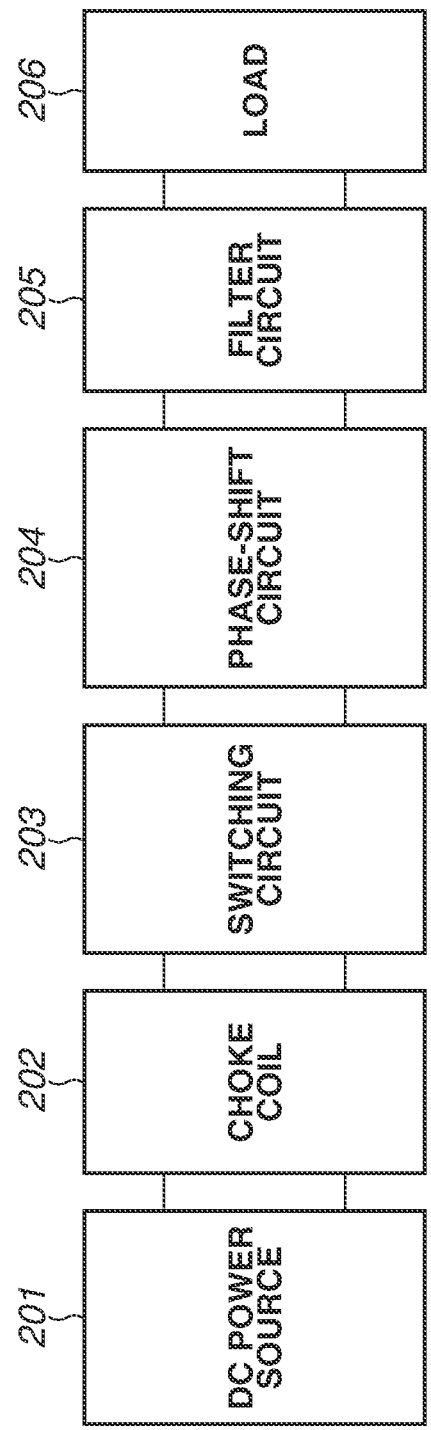
FIG. 2A
FIG. 2B

FIG.15

| | |
|---|---|
| COIL HEIGHT h [mm] | 5.0 |
| COIL RADIUS $r_R$ [mm] | 50 |
| COIL NUMBER-OF-TURNS N | 1 TO 10 |
| COIL NUMBER-OF-LAYERS $N_l$ | 1 |
| CONDUCTIVE WIRE DIAMETER d [mm] | 0.5 |
| CONDUCTIVE WIRE ADJACENT COEFFICIENT p [mm] | 0.5 |
| CONDUCTIVE WIRE RESISTIVITY $\rho_w$ [Ω·m] | $1.68 \times 10^{-8}$ (COPPER) |
| SWITCHING FREQUENCY f [MHz] | 0.5/1.0/2.5/6.78 |

POWER TRANSMISSION APPARATUS AND WIRELESS POWER TRANSMISSION SYSTEM

BACKGROUND

Field

The present disclosure relates to a power transmission apparatus and a wireless power transmission system.

Description of the Related Art

With an increase in speed of power switching devices in recent years, wireless power transmission techniques in high-frequency bands with an operating frequency of several megahertz or higher are currently being researched and developed.

Japanese Patent No. 5787027 discusses a power transmission system including a power transmission apparatus side resonance capacitor that configures a power transmission apparatus side resonance circuit with a power transmission coil, and a switching circuit having a parallel connection circuit (formed of a switching element, a diode, and a capacitor) electrically connected with the power transmission coil. The power transmission system further includes a power reception apparatus side resonance circuit having a power reception coil coupled with the power transmission coil through magnetic field resonance.

In changing a conventional wired power transmission system to a wireless power transmission system using a wireless power transmission technique, demands for, for example, high efficiency, space saving, and cost reduction are increasing.

SUMMARY

According to various embodiments of the present disclosure, a power transmission apparatus is provided which includes a first switching element having a first terminal and a second terminal, a first capacitor connected between the first and the second terminals of the first switching element, and a power transmission inductor connected to the first switching element on a direct-current (DC) basis and configured to wirelessly transmit alternating-current (AC) power.

Further features will become apparent from the following description of exemplary embodiments with reference to the attached drawings.

BRIEF DESCRIPTION OF THE DRAWINGS

FIGS. 2A and 2B illustrate an example of a configuration of a class-E power source according to one embodiment.

FIG. 15 illustrates numerical value settings for variables according to one embodiment.

DESCRIPTION OF THE EMBODIMENTS

Figure 1:
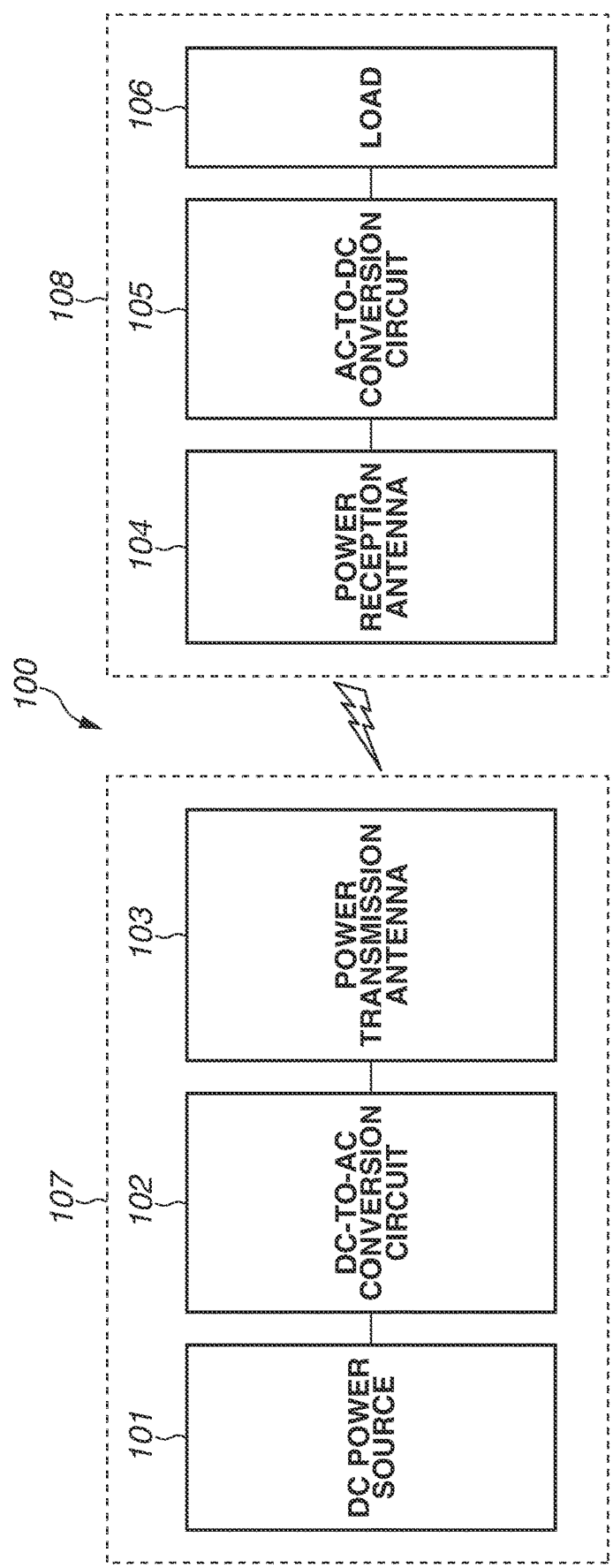
FIG. 1 is a block diagram illustrating an example of a configuration of a wireless power transmission system according to one embodiment.

FIG. 1 is a block diagram illustrating an example of a configuration of a wireless power transmission system 100 according to a first exemplary embodiment. The wireless power transmission system 100 includes a power transmission apparatus 107 and a power reception apparatus 108. The power transmission apparatus 107 includes a direct-current (DC) power source 101, a direct-current to alternating-current (AC) conversion circuit (DC-to-AC conversion circuit) 102, and a power transmission antenna 103. The DC power source 101 supplies a DC voltage (DC power). The DC-to-AC conversion circuit 102 converts the DC voltage supplied from the DC power source 101 into an AC voltage. The power transmission antenna 103 wirelessly transmits the AC voltage (AC power) generated in conversion by the DC-to-AC conversion circuit 102 to the power reception apparatus 108.

The power reception apparatus 108 includes a power reception antenna 104, an AC-to-DC conversion circuit 105, and a load 106. When the power reception antenna 104 receives the AC power from the power transmission antenna 103, an AC voltage is induced. The AC-to-DC conversion circuit 105 converts the AC voltage induced in the power reception antenna 104 into a DC voltage, and supplies the DC voltage to the load 106. The AC-to-DC conversion circuit 105 can be omitted. In this case, the power reception antenna 104 supplies the induced AC voltage to the load 106.

The DC-to-AC conversion circuit 102 converts the DC power supplied from the DC power source 101 into AC power by using, for example, a switching element for performing a high-speed switching operation, and supplies the AC power to the power transmission antenna 103. The wireless power transmission system 100 employing a class-E power source to improve the conversion efficiency will be described below.

A class-E power source is a power source system configured to reduce a conduction loss and a switching loss in a switching element, and thereby achieving high-efficiency high-frequency switching. The operating principle of the class-E power source will be described below. The class-E power source is defined as a power source in which the switching element changes from an OFF state to an ON state, when Vs=0 [V] and dVs/dt=0, where Vs is a voltage across the terminals of the switching element. Hereinafter, this switching operation is referred to as a Zero Voltage Switching (ZVS) operation. The DC-to-AC conversion circuit 102 converts DC power into AC power through the ZVS operation, and thereby achieving power conversion with less switching loss and high efficiency.

FIG. 2A is a circuit diagram illustrating an example of a configuration of a class-E power source 200. FIG. 2B is a block diagram illustrating an example of a function configuration of the class-E power source 200. The class-E power source 200 includes a DC power source 201, a choke coil 202, a switching circuit 203, a phase-shift circuit 204, a filter circuit 205, and a load 206.

The DC power source 201 includes a DC power source 211. The choke coil 202 includes an inductor $L_c$. The switching circuit 203 includes a switch control signal source 212 and a switching element 213. The phase-shift circuit 204 includes a capacitor $C_1$, and an inductor L. The filter circuit 205 includes an inductor $L_o$, and a capacitor $C_2$. The load 206 includes a resistor RL.

The negative terminals of the DC power source 211 and the switch control signal source 212 are connected to the reference potential node (e.g., ground potential node). The switching element 213 is, for example, a field effect transistor (FET). The inductor $L_c$ is connected between the positive terminal of the DC power source 211 and the drain terminal of the switching element 213. The positive terminal of the switch control signal source 212 connected to the gate terminal of the switching element 213 supplies a switch control signal (pulse signal) to the switching element 213. The source terminal of the switching element 213 is connected to the reference potential node. The capacitor $C_1$ is connected between the drain terminal and the source terminal of the switching element 213. A series connection circuit formed of the inductor $L_x$, the inductor $L_o$, the capacitor $C_2$, and the resistor RL is connected in parallel with the capacitor $C_1$.

The DC power source 201 supplies the DC voltage for the power transmission apparatus 107. The choke coil 202 converts the DC voltage supplied from the DC power source 201 into a DC current and smooths the DC current. The switching circuit 203 switches the DC current supplied from the DC power source 201 via the choke coil 202 by using the switching element 213 to convert the DC power into AC power. The switching element 213 is, for example, an FET capable of operating at a high speed having a small conduction loss. The phase-shift circuit 204 has a role of changing the current and voltage phases to enable the switching circuit 203 to perform the ZVS operation. The inductor $L_x$ included in the phase-shift circuit 204 mainly has this role. An inductor $L_x$ having a sufficient impedance with respect to a switching frequency is a prerequisite for the class-E power source to perform the ZVS operation. The filter circuit 205 filters the AC power supplied from the switching circuit 203 via the phase-shift circuit 204, and band-limits the AC voltage supplied to the load 206. The Quality Factor (Q) value $Q_L$, which represents a narrowness of a passband of the filter circuit 205 is given by formula (1):

$$Q_L = \frac{\omega(L_o + L_x)}{RL + r_{L_o} + r_{L_x}} = \frac{1}{RL + r_{L_o} + r_{L_x}} \sqrt{\frac{L_o + L_x}{C_2}}, \tag{1}$$

where $r_{L_o}$ is a DC resistance value of the inductor $L_o$, and $r_{L_x}$ is a DC resistance value of the inductor L.

The narrower the passband of the filter circuit 205, the closer a voltage waveform supplied to the load 206 is to the sine wave occurring in a vicinity of the switching frequency. When the filter circuit 205 performs band limiting, the harmonic power decreases and the AC power with little noise is supplied to the load 206. As is clear from formula (1), the larger the inductance of the inductor $L_o$ and smaller the capacitance of the capacitor $C_2$, the larger the narrowness $Q_L$ of the passband becomes and the narrower the passband of the filter circuit 205 becomes. However, increasing the inductance of the inductor $L_o$ used for the filter circuit 205 also increases a DC resistance of the inductor $L_o$, and thus degrading the power conversion efficiency of the class-E power source. In this case, there are trade-off factors in designing a class-E power source. When the filter circuit 205 is in a resonance state at the switching frequency, the inductance of the inductor $L_x$ of the phase-shift circuit 204 is calculated by the following formula (2):

$$L_x = 1.1525 \cdot \frac{RL + r_{L_o} + r_{L_x}}{\omega}, \tag{2}$$

where ω is an angular frequency of the switching frequency of the switching circuit 203. The constant 1.1525 is determined by a duty ratio Dt of the switch control signal of the switch control signal source 212. In this formula, the duty ratio Dt is set to 0.5.

Figure 11:
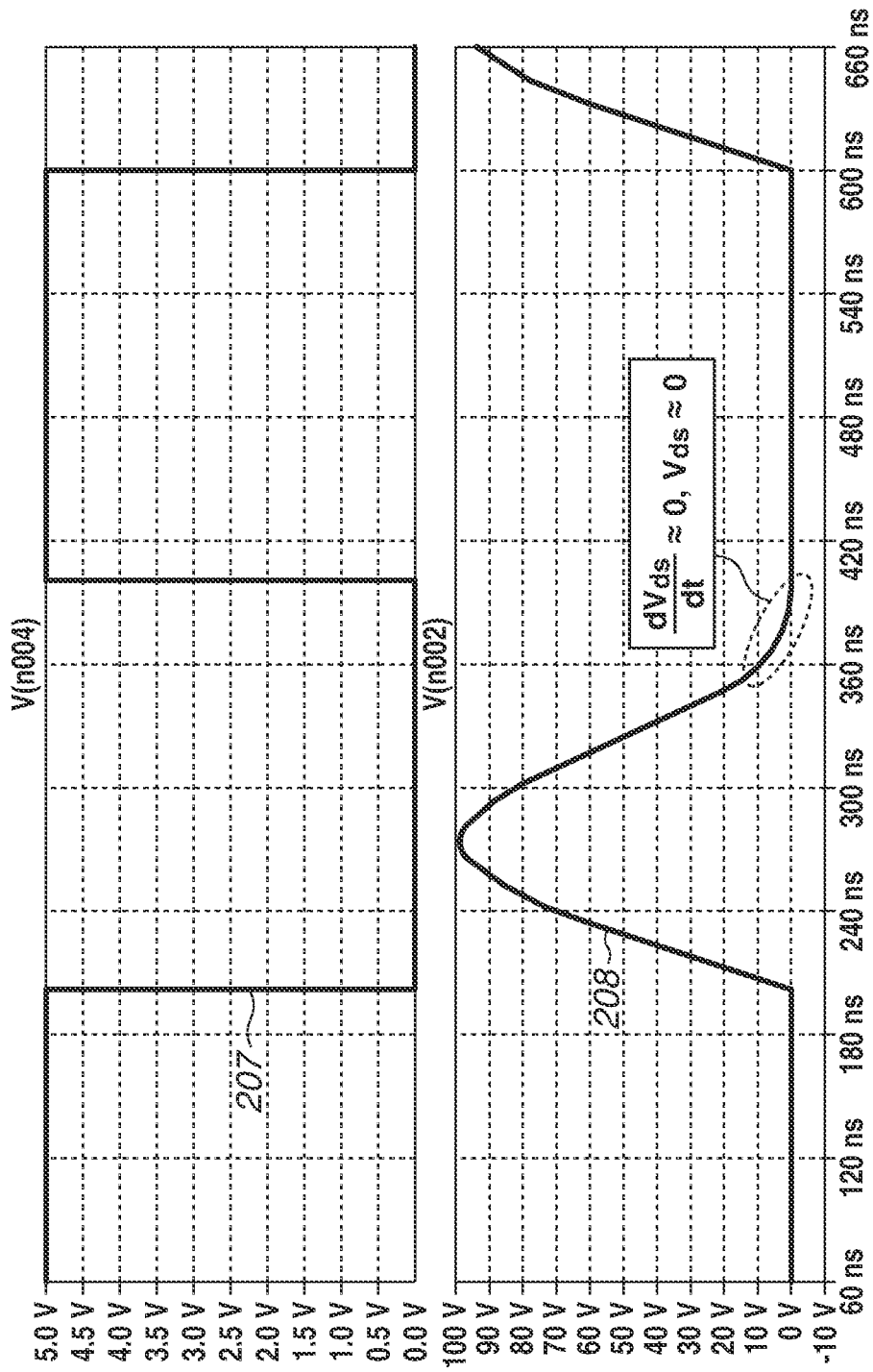
FIG. 11 illustrates a switching control signal waveform and a Vds waveform according to one embodiment.

As is clear from formula (2), the inductance of the inductor $L_x$ is a limited inductance value calculated based on multidimensional parameters including the load resistor RL, the switching frequency, and the switching duty ratio of the class-E power source. In the class-E power source, only when the inductor $L_x$ is suitably designed, the voltage waveform between the drain terminal and the source terminal (referred to as a Vds waveform) of the PET satisfies a class-E operating condition. FIG. 11 illustrates a switching control signal waveform and a Vds waveform when the inductor $L_x$ is suitably designed and the class-E operating condition is satisfied. A Vds waveform 208 has values of Vds=0 V and dVds/dt=0 at the timing when a switching control signal waveform 207 changes from an OFF state (0 V) to an ON state (5 V), thus satisfying the class-E operating condition.

Figure 3:
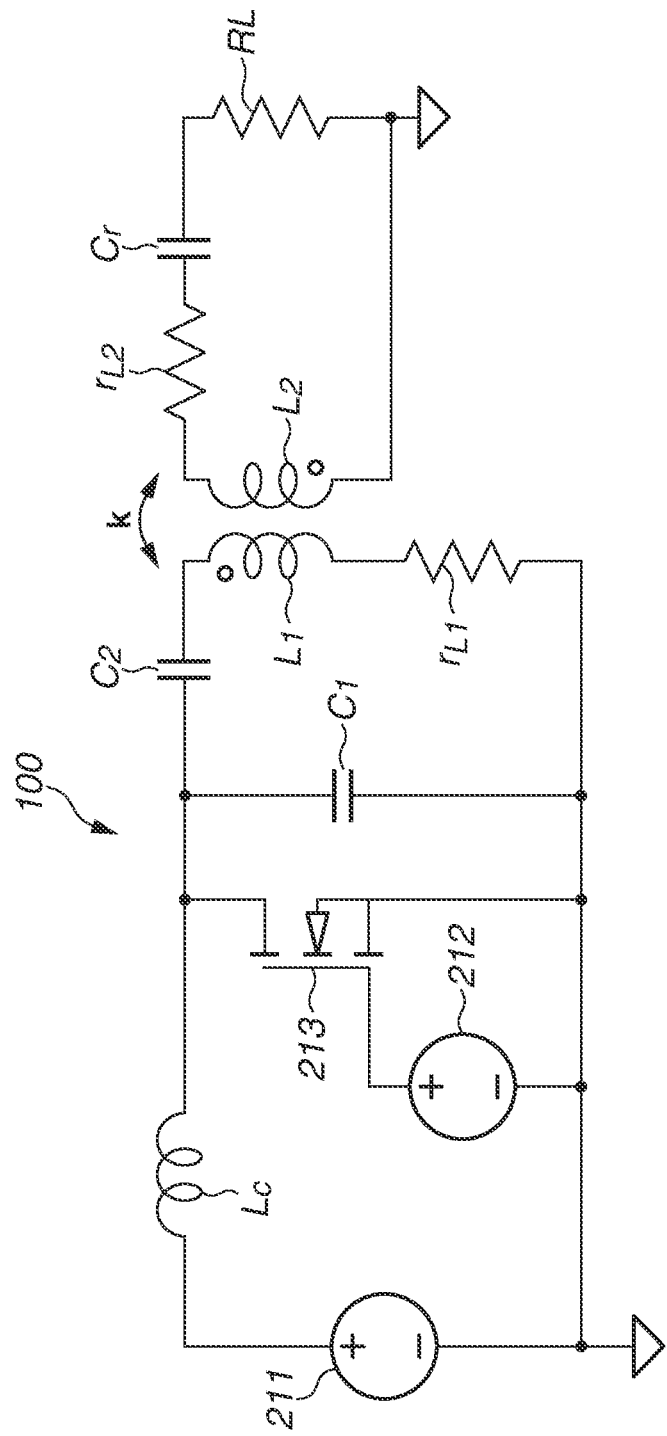
FIG. 3 is a circuit diagram illustrating an example of a configuration of a wireless power transmission system using a class-E power source according to one embodiment.

FIG. 3 is a circuit diagram illustrating an example of a configuration of the wireless power transmission system 100 using a class-E power source. The wireless power transmission system 100 uses the class-E power source 200 illustrated in FIG. 2A for the power transmission apparatus 107 illustrated in FIG. 1. The wireless power transmission system 100 illustrated in FIG. 3 differs from the wireless power transmission system 100 illustrated in FIG. 1 in that the AC-to-DC conversion circuit 105 is removed.

The connections for the DC power source 211, the inductor $L_x$, the switch control signal source 212, the switching element 213, and the capacitor $C_1$ is the same as the connections illustrated in FIG. 2A. The series connection circuit formed of a capacitor $C_2$, an inductor $L_1$, and a resistor $r_{L1}$ is connected in parallel with the capacitor $C_1$.

An inductor $L_2$ is coupled to the inductor $L_1$ with a coupling coefficient k. One terminal of the inductor $L_2$ is connected to the reference potential node. The other terminal of the inductor $L_2$ is connected to the reference potential node via the series connection circuit formed of a resistor $r_{L2}$, a capacitor $C_r$, and the resistor RL.

The DC power source 211 corresponds to the DC power source 101 illustrated in FIG. 1. The switch control signal source 212 and the switching element 213 correspond to the DC-to-AC conversion circuit 102 illustrated in FIG. 1. The inductor $L_1$ corresponds to the power transmission antenna 103 illustrated in FIG. 1. The inductor $L_1$ integrates the inductors $L_x$ and $L_o$ illustrated in FIG. 2A. An inductance of the inductor $L_1$ is a sum of the inductances of the inductors $L_x$ and $L_o$.

The inductor $L_2$ corresponds to the power reception antenna 104 illustrated in FIG. 1. The inductors $L_1$ and $L_2$ are coupled with each other with a coupling coefficient k. The resistance $r_{L1}$ is an actual resistive component of the inductor (power transmission antenna) $L_1$. The resistance $r_{L2}$ is an actual resistive component of the inductor (power reception antenna) $L_2$. The capacitor $C_r$ as a resonance capacitor has a capacitance that resonates the inductance of the inductor $L_2$ at a power transmission frequency. The resistor RL corresponds to the load 106 illustrated in FIG. 1. A theoretical limit $\eta_{MAX}$ of a power transmission efficiency of the wireless power transmission system 100 is calculated by the following formula (3):

$$\eta_{MAX} = \frac{k^2 \omega^2 L_1 L_2 RL}{r_{L1}(RL+r_{L1})+k^2\omega^2 L_1 L_2(RL+r_{L2})}. \tag{3}$$

Figure 4:
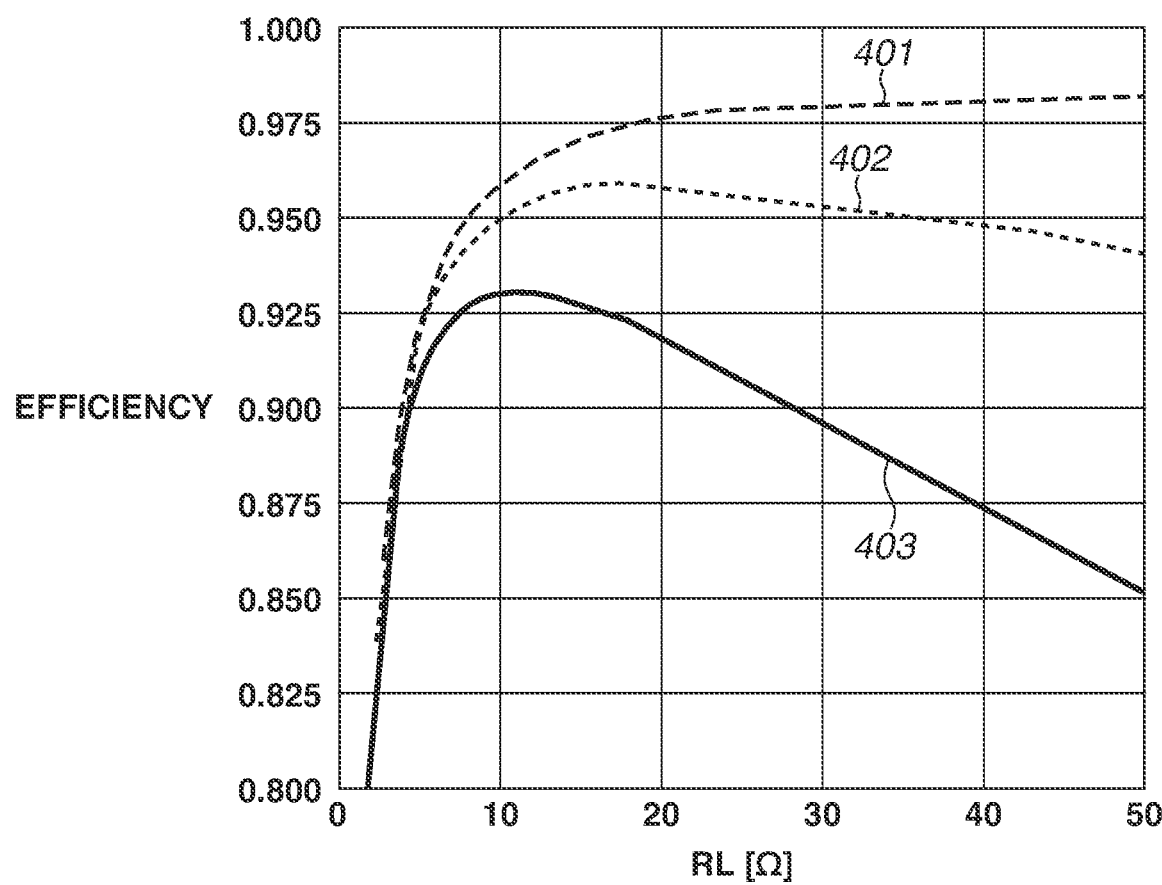
FIG. 4 is a graph illustrating an efficiency of a wireless power transmission system according to one embodiment.

FIG. 4 is a graph illustrating a result of numerically analyzing the influence of the resistance $r_{L1}$ on the power transmission efficiency of the wireless power transmission system 100. The horizontal axis indicates a resistance RL (resistance of the resistor RL), and the vertical axis indicates the power transmission efficiency of the wireless power transmission system 100.

The inductance of each of the inductors $L_1$ and $L_2$ is 201. The coupling coefficient k is 0.8. The angular frequency $\omega$ is $2\pi f = 2\pi * 3 * 10^6$. The resistance $r_{L2}$ is 0.4 ohms.

The line 401 indicates characteristics of the power transmission efficiency with respect to the resistance RL when the resistance $r_{L1}$ is 0.2 ohms. The line 402 indicates characteristics of the power transmission efficiency with respect to the resistance RL when the resistance $r_{L1}$ is 1 ohm. The line 403 indicates characteristics of the power transmission efficiency with respect to the resistance RL when the resistance $r_{L1}$ is 3 ohms. This analysis result demonstrates that the increase in the resistance $r_{L1}$ degrades the power transmission efficiency particularly in a region with a large resistance RL. In the wireless power transmission system 100, decreasing the resistance $r_{L1}$ enables obtaining the high power transmission efficiency even with fluctuations of the resistance RL of the load 106.

When the power reception apparatus 108 of the wireless power transmission system 100 is in a resonance state at the power transmission frequency, the impedance $R_{eq}$ of the power reception apparatus 108 viewed from the power transmission apparatus 107 is represented by the following formula (4):

$$R_{eq} = \frac{k^2 \omega^2 L_1 L_2}{RL+r_{L2}}. \tag{4}$$

Figure 5:
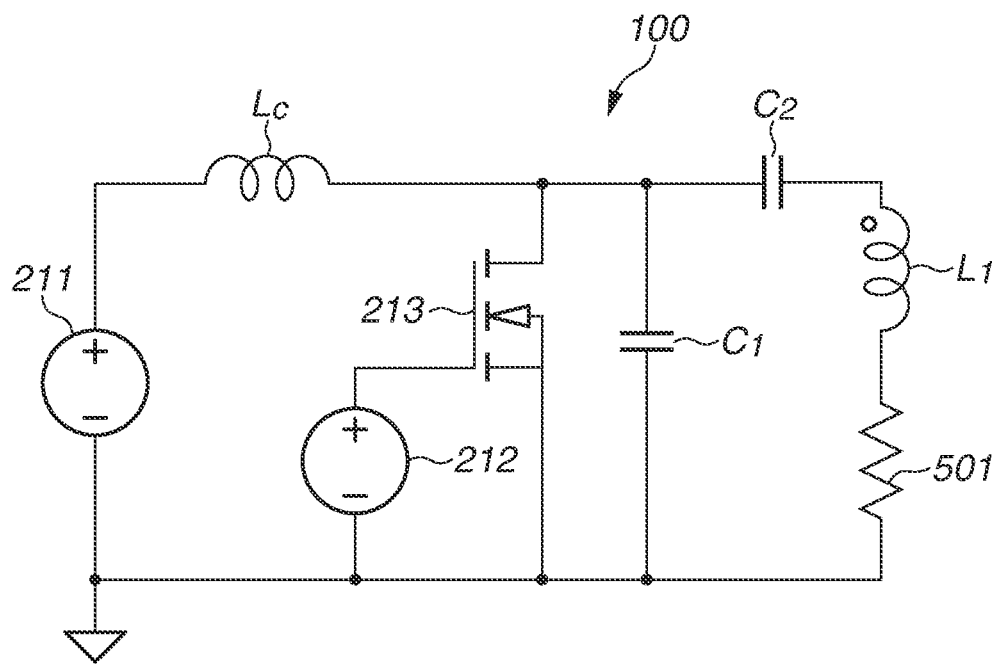
FIG. 5 is an equivalent circuit diagram of a wireless power transmission system according to one embodiment.

FIG. 5 is an equivalent circuit diagram of the wireless power transmission system 100 illustrated in FIG. 3. The wireless power transmission system 100 illustrated in FIG. 5 differs from the wireless power transmission system 100 illustrated in FIG. 3 in that the inductor $L_2$, the resistor $r_{L2}$, the capacitor $C_r$, and the resistor RL are removed, and a resistor 501 is provided as a substitute for the resistor $r_{L1}$. The series connection circuit formed of the capacitor $C_2$, the inductor $L_1$, and the resistor 501 is connected in parallel with the capacitor $C_1$. The resistor 501 has an impedance of a sum of the resistance $r_{L1}$ illustrated in FIG. 3 and the impedance $R_{eq}$ represented by formula (4).

Figure 6:
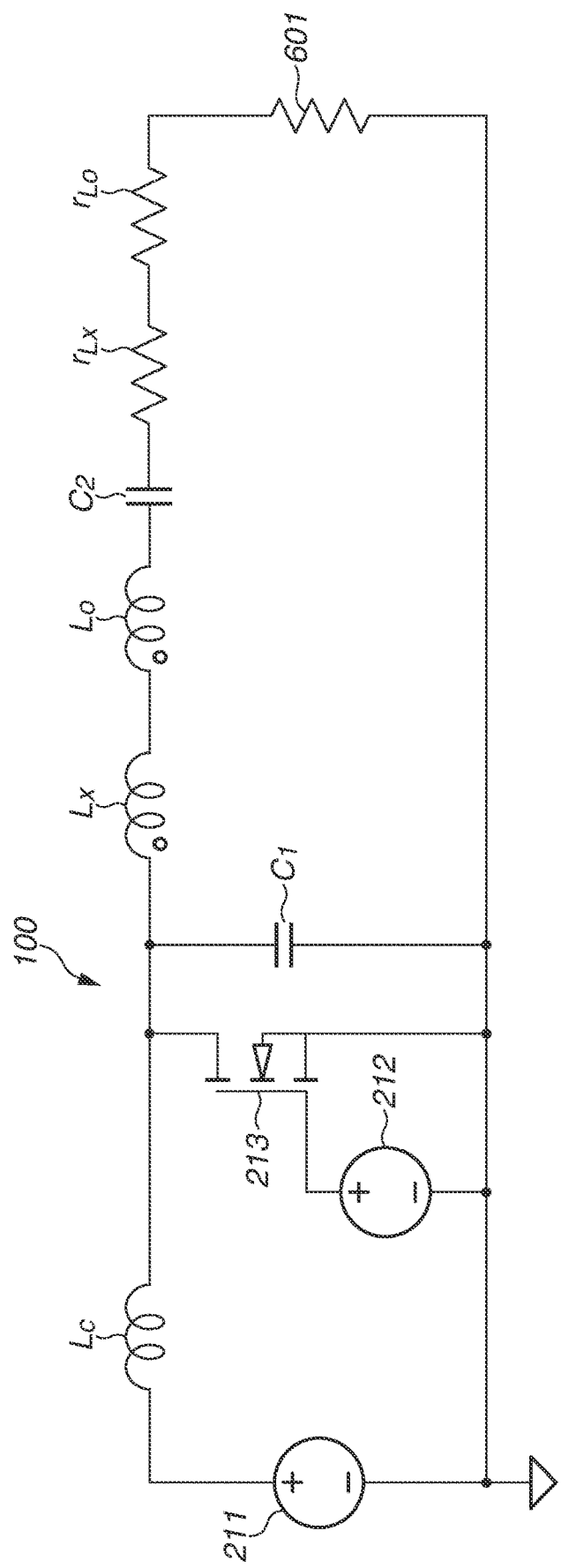
FIG. 6 illustrates an example of a configuration of a wireless power transmission system according to one embodiment.

FIG. 6 illustrates an example of a configuration of the wireless power transmission system 100 in which components of the wireless power transmission system 100 illustrated in FIG. 5 are decomposed for each function of the class-E power source 200 illustrated in FIGS. 2A and 2B. The wireless power transmission system 100 illustrated in FIG. 6 differs from the wireless power transmission system 100 illustrated in FIG. 5 in that the connection circuit formed of the inductor $L_x$, the inductor $L_o$, the capacitor $C_2$, the resistor $r_{Lx}$, the resistor $r_{Lo}$, and the resistor 601 is provided as a substitute for the connection circuit formed of the capacitor $C_2$, the inductor $L_1$, and the resistor 501. The series connection circuit formed of the inductor $L_x$, the inductor $L_o$, the capacitor $C_2$, the resistor $r_{Lx}$, the resistor $r_{Lo}$, and the resistor 601 is connected in parallel with the capacitor $C_1$. The resistor 601 has the above-described impedance $R_{eq}$. The resistor nix has an actual resistive component of the inductor $L_x$. The resistor $r_{Lo}$ is an actual resistive component of the inductor $L_o$.

As illustrated in FIG. 4, the increase in the resistance $r_{L1}$ degrades the power transmission efficiency. The reason will be described below with reference to FIG. 6. A power conversion efficiency $\eta_{TX}$ of the power transmission apparatus 107 of the wireless power transmission system 100 is represented by the following formula (5):

$$\eta_{TX} = \frac{R_{eq}}{R_{eq}+r_{L1}} = \frac{R_{eq}}{R_{eq}+(r_{Lx}+r_{Lo})}, \tag{5}$$

where resistance $r_{L1}$ is a sum of the resistance $r_{Lx}$ and the resistance $r_{Lo}$.

As is clear from formula (5), the resistance $r_{L1}$ is reduced to improve the power conversion efficiency $\eta_{TX}$ of the power transmission apparatus 107. Next, minimizing the resistance $r_{L1}$ will be considered Minimizing the resistance $r_{L1}$ means minimizing the inductance of the inductor (power transmission antenna) $L_1$. In the class-E power source, as described above, the inductance of the inductor $L_x$ is a limited inductance value. Thus, minimizing the inductor $L_o$ used for the filter circuit 205 will be considered. If it is permitted that the voltage waveform supplied to the load 206 includes harmonic components, the inductor $L_o$ can be minimized Thus, the maximum efficiency of the class-E power source is represented by formula (6):

$$\eta_{TX\_MAX} = \lim_{r_{L_o} \to 0} \left( \frac{R_{eq}}{R_{eq} + (r_{L_x} + r_{L_o})} \right) = \frac{R_{eq}}{R_{eq} + r_{L_x}}. \tag{6}$$

The minimum inductance of the inductor $L_x$ of the phase-shift circuit 204 required for the class-E power source to perform the ZVS operation can be updated to the following formula (7) using the impedance $R_{eq}$:

$$L_x = 1.1525 \cdot \frac{R_{eq} + r_{L_1}}{\omega}. \tag{7}$$

In the wireless power transmission system 100, the power conversion efficiency $\eta_{TX}$ of the power transmission apparatus 107 can accordingly be maximized by bringing the inductance of the inductor (power transmission antenna) $L_1$ close to the inductance of the inductor $L_x$ represented by formula (7).

As described above, the power conversion efficiency of the power transmission circuit can be maximized by minimizing the inductance of the inductor $L_o$ ($r_{L0}$), which functions as a filter circuit. Next, the capacitor $C_2$ used for the filter circuit 205 will be described. The capacitance $C_2$ of the filter circuit 205 is calculated by formula (8):

$$C_2 = \frac{1}{\omega^2(L_1 - L_x)} = \frac{1}{\omega^2 L_o}. \tag{8}$$

In a case of determining the inductance of the inductor $L_1$ based on the principle according to the present exemplary embodiment, the capacitor $C_2$ calculated by formula (8) mathematically diverges as represented by formula (9). More specifically, since the capacitor $C_2$ has only a negligible reactance component at the switching frequency, the capacitor $C_2$ can be excluded from the circuit. In other words, the inductor (power transmission antenna) $L_1$ and the switching element 213 can be connected directly or via a conductive wire on a DC basis.

$$\lim_{L_o \to 0} C_2 = \lim_{L_o \to 0} \frac{1}{\omega^2 L_o} \approx \infty \tag{9}$$

Figure 7:
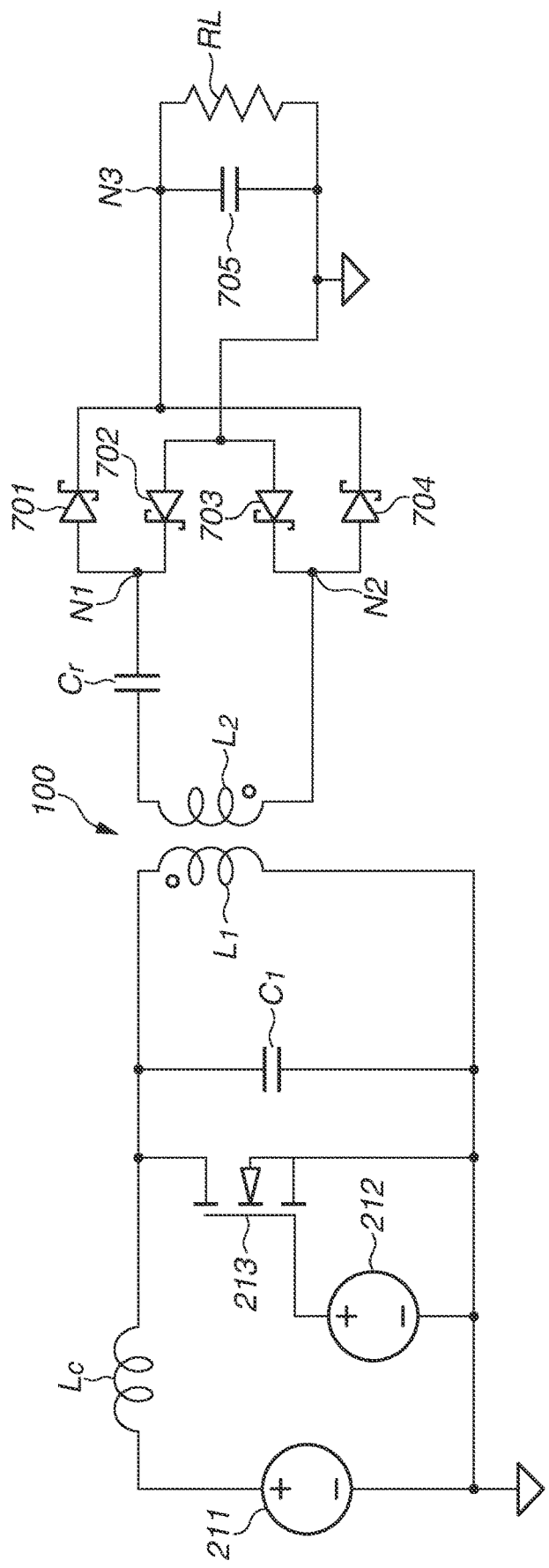
FIG. 7 is a circuit diagram illustrating an example of a configuration of a wireless power transmission system according to one embodiment.

FIG. 7 illustrates the wireless power transmission system 100 in which, based on the above-described principle, the capacitor $C_2$ is removed and the inductor (power transmission antenna) $L_1$ and the switching element 213 are connected directly or via a conductive wire on a DC basis. The potential difference Vs between the drain terminal and the source terminal of the switching element 213 of the class-E power source becomes a peak value having 3 to 5 times that of the DC power voltage. Thus, the withstand voltage equal to or higher than the peak voltage is demanded for each element. Capacitors having favorable high-frequency characteristics and high withstand voltage are, in general, expensive and large in size. Thus, it is advantageous to remove the capacitor $C_2$ as illustrated in FIG. 7 from a viewpoint of cost reduction and space saving. In addition, since the mount space for the capacitor $C_2$ is no longer needed, the switching node (the wiring pattern lead to the drain of the FET) can be minimized, providing advantages from the viewpoint of noise emission.

However, the wireless power transmission system 100 may physically include a capacitor $C_2$ with a sufficiently small reactance. Although, in this case, the number of parts increases, the wireless power transmission system 100 can achieve a power transmission performance equivalent to that of the configuration illustrated in FIG. 7. A relation between the inductor $L_o$ and the capacitor $C_2$ has been descried above. Next, a relation between the inductor $L_1$ and the capacitor $C_2$ will be described below. If the ratio of the inductance of the inductor $L_1$ to the inductance of the inductor $L_o$ is 1:α, an inductance of the inductor $L_o$ is represented by formula (10):

$$L_o = \alpha L_1 \tag{10}.$$

When the relation represented by formula (8) is satisfied, a capacitance $C_2$ of the filter circuit 205 is given by formula (11):

$$C_2 = \frac{1}{\omega^2 \alpha L_1}. \tag{11}$$

In other words, a reactance $Z_{c2}$ of the capacitor $C_2$ of the filter circuit 205 is given by formula (12):

$$Z_{c2} = \alpha(\omega L_1) = \alpha Z_{L_1} \tag{12}$$

where $Z_{L1}$ is a reactance of the inductor $L_1$.

If α is sufficiently smaller than 1, the capacitance of the capacitor $C_2$ increases, and the reactance $Z_{c2}$ of the capacitor $C_2$ decreases, similarly to the case of formula (9). In other words, formula (9) can be represented by formula (13) using α:

$$\alpha = \frac{Z_{C_2}}{Z_{L_1}} \ll 1 \leftrightarrow C_2 \approx \infty. \tag{13}$$

If the condition of formula (13) is satisfied, the capacitor $C_2$ and the inductor $L_o$ of the filter circuit 205 hardly provide a filter function. According to the purpose of the present exemplary embodiment, design based on formula (13) is the most desirable in a case of placing higher priority on improving the power conversion efficiency $\eta_{TX}$ than on subjecting the filter to band-limitation and supplying AC power having little noise to the load 206.

In applications that satisfy the condition of formula (13) and cause no problem at the cost of the function of the filter circuit 205, a coupling capacitor $C_2$ may be inserted at a position electrically equivalent to the capacitor $C_2$ for the purpose of AC coupling. The insertion of the capacitor $C_2$ that satisfies the condition of formula (13) does not disturb at all the improvement in the power conversion efficiency $\eta_{TX}$ by the minimization of the inductance $L_1$ according to the present exemplary embodiment.

FIG. 7 is a circuit diagram illustrating an example of a configuration of the wireless power transmission system 100 according to the present exemplary embodiment. The wireless power transmission system 100 illustrated in FIG. 7 differs from the wireless power transmission system 100 illustrated in FIG. 3 in that the capacitor $C_2$ is removed, and the AC-to-DC conversion circuit 105 illustrated in FIG. 1 is added. The AC-to-DC conversion circuit 105 includes diodes 701 to 704, and the capacitor 705, and converts AC power into DC power.

The efficiency of the wireless power transmission system 100 can be represented by the product of the efficiency between the power transmission antenna 103 and the power reception antenna 104 and the DC-to-AC conversion efficiency (AC-to-DC conversion efficiency). The wireless power transmission system 100 can optimize the overall efficiency by optimizing each of the efficiencies. The wireless power transmission system 100 determines parameters (inductances of the inductors $L_1$ and $L_2$, switching frequency, and circuit constants) for optimizing the above-described two efficiencies under limitations of, for example, size, output power, input voltage, and ZVS operation warranty of the inductors $L_1$ and $L_2$.

The switching frequency of the switching element 213 is, for example, 100 kHz to 15 MHz. In the wireless power transmission system 100 illustrated in FIG. 7, the size and cost can be reduced by removing the capacitor $C_2$ illustrated in FIG. 3 at the switching frequency. Differences of the wireless power transmission system 100 illustrated in FIG. 7 from the wireless power transmission system 100 illustrated in FIG. 3 will be described below.

Referring to FIG. 7, notations of the resistors $r_{L1}$ and $r_{L2}$ illustrated in FIG. 3 are omitted. However, the wireless power transmission system 100 illustrated in FIG. 7 actually includes the resistors $r_{L1}$ and $r_{L2}$ illustrated in FIG. 3. The DC power source 211 and the inductor $L_c$ are connected in series between the drain terminal and the source terminal of the switching element 213.

The wireless power transmission system 100 includes the power transmission apparatus 107 and the power reception apparatus 108 illustrated in FIG. 1. The power transmission apparatus 107 includes the DC power source 211, the switch control signal source 212, the switching element 213, the inductor $L_c$, the capacitor $C_1$, and the inductor $L_1$. The power reception apparatus 108 includes the inductor $L_2$, the capacitor $C_r$, the diodes 701 to 704, the capacitor 705, and the resistor RL.

The inductor $L_1$ having the first and the second terminals is a power transmission inductor for wirelessly transmitting AC power. The first terminal and the second terminal of the inductor $L_1$ are connected to the drain terminal and the source terminal of the switching element 213, respectively. The drain terminal and the source terminal of the switching element 213 are connected, on a DC basis, to the first terminal and the second terminal of the inductor $L_1$, respectively. More specifically, the drain terminal and the source terminal of the switching element 213 are connected directly or via a conductive wire to the first terminal and the second terminal of the inductor $L_1$, respectively. The capacitor $C_1$ is connected between the drain terminal and the source terminal of the switching element 213.

The inductor $L_2$ having the first and the second terminals is a power reception inductor for wirelessly receiving AC power. The capacitor $C_r$ is connected between the first terminal of the inductor $L_2$ and a node N1. The second terminal of the inductor $L_2$ is connected to a node N2.

For the diode 701, an anode is connected to the node N1, and a cathode is connected to a node N3. For the diode 702, an anode is connected to the reference potential node, and a cathode is connected to the node N1. For the diode 703, an anode is connected to the reference potential node, and a cathode is connected to the node N2. For the diode 704, an anode is connected to the node N2, and a cathode is connected to the node N3.

The diodes 701 to 704 form a full-wave rectifier circuit for rectifying AC power (AC voltage) at the nodes N1 and N2 and outputs DC power (DC voltage) to the node N3 and the reference potential node. The capacitor 705 is connected between the node N3 and the reference potential node to smooth the DC power. The resistor RL performing as the load 106 illustrated in FIG. 1 is connected between the node N3 and the reference potential node. The resistor RL is supplied with the DC power.

In the wireless power transmission system 100, similarly to a class-E power source, a potential difference Vs between the drain terminal and the source terminal of the switching element 213 is approximately zero at a timing when the switching element 213 changes from an OFF state to an ON state. Further, a change in the potential difference (dVs/dt) between the drain terminal and the source terminal of the switching element 213 is approximately zero at a timing when the switching element 213 changes from an OFF state to an ON state.

For the wireless power transmission system 100 illustrated in FIG. 7, the AC-to-DC conversion circuit 105 (the diodes 701 to 704 and the capacitor 705) may be removed, as the wireless power transmission system 100 illustrated in FIG. 3. In this case, a first terminal of the inductor $L_2$ is connected to the node N3 via the capacitor $C_r$. A second terminal of the inductor $L_2$ is connected to the reference potential node. The resistor RL is connected between the node N3 and the reference potential node.

As described above, in the wireless power transmission system 100, the size and cost can be reduced by removing the capacitor $C_2$ illustrated in FIG. 3.

Figure 12A:
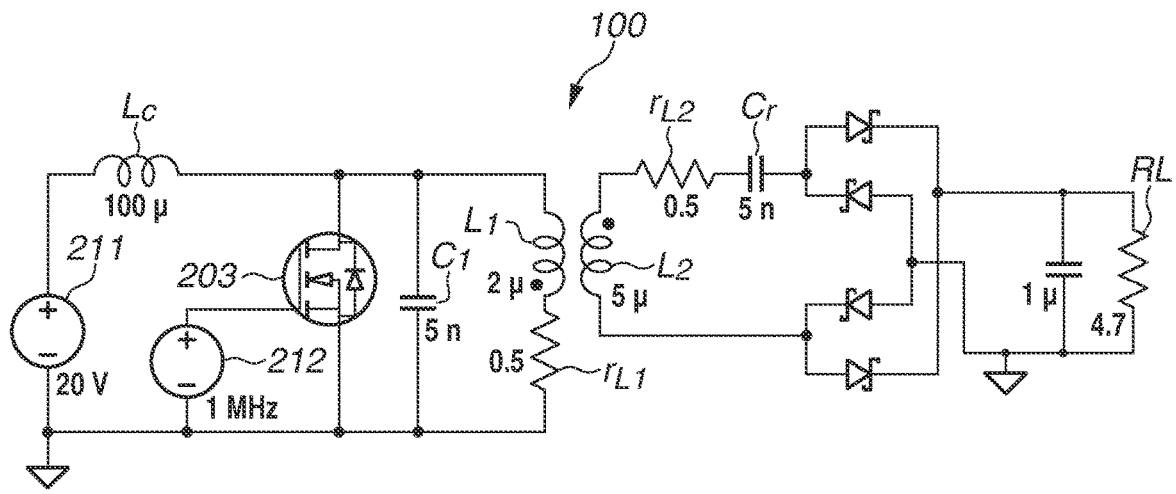
FIGS. 12A and 12B illustrate a wireless power transmission system according to one embodiment.

FIG. 12A illustrates an example of a circuit in which specific circuit constants are set for the wireless power transmission system 100 illustrated in FIG. 7. The inductors $L_1$ and $L_2$ are coupled with a coupling coefficient of 0.3. A switching frequency of the switching element 213 is set to 1 MHz.

Figure 12B:
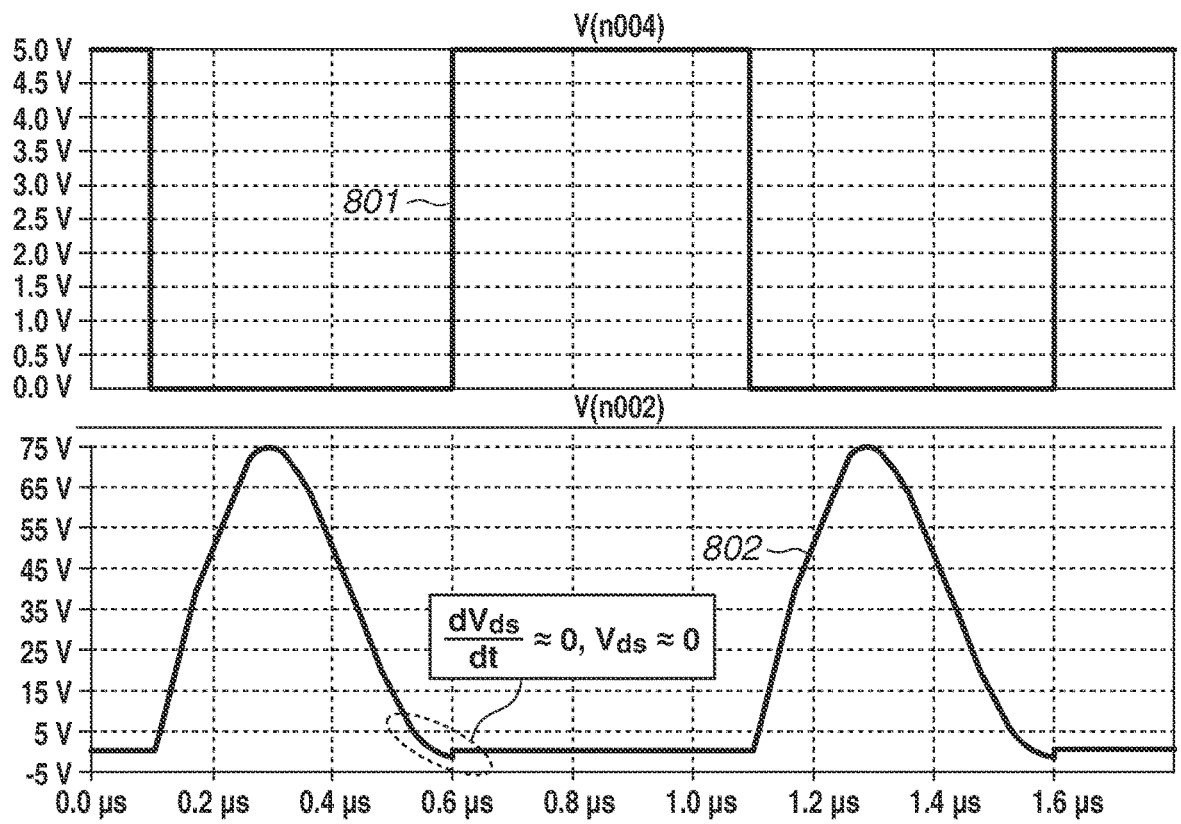

FIG. 12B illustrates a result of a circuit simulation for the wireless power transmission system 100 illustrated in FIG. 12A. In the wireless power transmission system 100 illustrated in FIG. 12B, the load resistor RL consumes power of about 13 W (8 V, 1.6 A). The waveform 801 indicates the switching signal for the switching element 213 output by the switch control signal source 212. The waveform 802 indicates the voltage Vs applied between the drain terminal and the source terminal of the switching element 213. For the waveform 802, the potential difference Vs between the drain and the source terminals of the switching element 213 is approximately zero at a timing when the switching element 213 changes from an OFF state to an ON state. Further, the change of the potential difference (dVs/dt) between the drain and the source terminals of the switching element 213 is approximately zero at a timing when the switching element 213 changes from an OFF state to an ON state. Consequently, this simulation demonstrates the feasibility of a high-efficiency class-E power source that achieves the ZVS operation in the wireless power transmission system 100 in which the capacitor $C_2$ is removed. By optimizing the resistance $L_1$ (minimizing the resistance $r_{L1}$) while satisfying the ZVS operation condition by using the above-described method, the power transmission unit of the wireless power transmission system 100 can achieve high efficiency to a maximum extent.

The above-described descriptions have been made from a viewpoint of the maximum efficiency of the power transmission unit of the wireless power transmission system 100. However, to achieve the maximization of a total system efficiency $\eta_{ALL}$ of the wireless power transmission system 100, a loss occurring at the power reception antenna 104 cannot be ignored.

Figure 13:
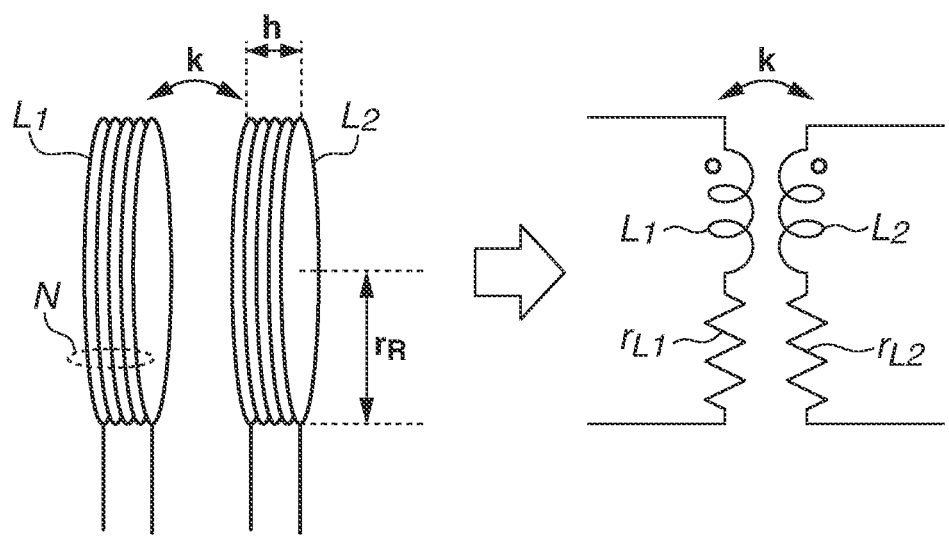
FIG. 13 illustrates a power transmission antenna and a power reception antenna according to one embodiment.

A relation between the total system efficiency $\eta_{ALL}$ in the wireless power transmission system 100 and a will be considered. As representative examples of the power transmission antenna 103 and the power reception antenna 104, a solenoid coil having a form illustrated in FIG. 13 will be assumed. In FIG. 13, N is a number of turns for the solenoid coil, $r_R$ is a radius of the solenoid coil, and h is a height (thickness) of the solenoid coil. Publicly known representative analysis formulas will be introduced to obtain an equivalent series resistance and a self-inductance with respect to changes of the number of turns N and the radius $r_R$ of the solenoid coil. The self-inductance of the solenoid coil is represented by formula (14):

$$L = \frac{K_N \mu_o \pi r_R^2 N^2}{h}, \tag{14}$$

where $K_N$ is a Nagaoka coefficient, and no is a vacuum permeability.

The Nagaoka coefficient $K_N$ is represented by formula (15):

$$K_N = \frac{4}{3\pi\sqrt{1-k_N^2}} \left( \frac{1-k_N^2}{k_N^2} K(k_N) - \frac{1-2k_N^2}{k_N^2} \cdot \overline{b}(k_N) - k_N \right). \tag{15}$$

In formula (15), $k_N$ is given by formula (16):

$$k_N = \frac{1}{\sqrt{\frac{h}{(2r)^2} + 1}}. \tag{16}$$

A function $K(k_N)$ is a complete elliptic integral of the first kind for $k_N$. A function $E(k_N)$ is a complete elliptic integral of the second kind for $k_N$. These functions are represented by formulas (17) and (18):

$$K(k_N) = \int_0^{\frac{\pi}{2}} \frac{1}{\sqrt{1-k_N^2 \sin^2 \theta}} d\theta, \tag{17}$$

$$E(k_N) = \int_0^{\frac{\pi}{2}} \sqrt{1-k_N^2 \sin^2 \theta}\, d\theta. \tag{18}$$

Next, an analysis formula for obtaining the equivalent series resistance of the solenoid coil will be introduced. With an increase in a frequency f of a current sent to the solenoid coil, an equivalent series resistance is known to increase by a proximity effect between conductive wires and a skin effect. If the equivalent series resistance has an increasing rate $F_R$ and the solenoid coil has a DC resistance $R_{wdc}$, the equivalent series resistance of the solenoid coil is given by formula (19):

$$r_L = F_R R_{wdc} \tag{19}$$

For representing the increasing rate $F_R$ of the equivalent series resistance, a Dowell's equation is used as an analysis formula. The Dowell's equation is represented by formula (20):

$$F_R = A\left[ \frac{\sinh(2A) + \sin(2A)}{\cosh(2A) - \cos(2A)} + \frac{2(N_l^2 - 1)}{3} \frac{\sinh(A) - \sin(A)}{\cosh(A) + \cos(A)} \right], \tag{20}$$

where $N_l$ is a number of layers of the windings of the solenoid coil in a radial direction.

In formula (20), A is given by formula (21):

$$A = \left(\frac{\pi}{4}\right)^{\frac{3}{4}} \frac{d}{\delta_w} \sqrt{\frac{d}{p}}, \tag{21}$$

where d is a diameter of the conductive wire, p is an adjacent coefficient of the conductive wire, and $\delta_w$ is a skin thickness corresponding to a frequency f of the current flowing in the conductive wire.

Figure 14:
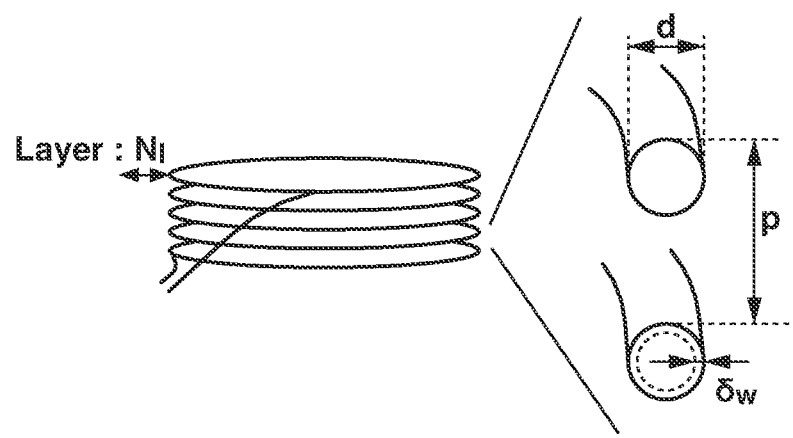
FIG. 14 illustrates an adjacent coefficient and a skin thickness of a conductive wire according to one embodiment.

The skin thickness $\delta_w$ is given by formula (22):

$$\delta_w = \sqrt{\frac{\rho_w}{\pi \mu_o f}}, \tag{22}$$

where $\rho_w$ is a resistivity of the conductive wire. Physical images of the adjacent coefficient p and the skin thickness $\delta_w$ of the conductive wire are illustrated in FIG. 14.

The DC resistance $R_{wdc}$ of the solenoid coil is given by formula (23):

$$R_{wdc} = \frac{\rho_w l_w}{A}, \tag{23}$$

where $l_w$ is a winding length of the conductive wire.

Considerations will be made by setting specific numerical values for formulas (14) to (23). Numerical values set for the variables are illustrated in FIG. 15. The coil radius $r_R$ was set to 50 mm as a practical antenna radius. The switching frequency f (i.e., the frequency of the current flowing in the conductive wire) was set to 0.5 MHz, 1.0 MHz, 2.5 MHz, and 6.78 MHz.

Figure 16A:
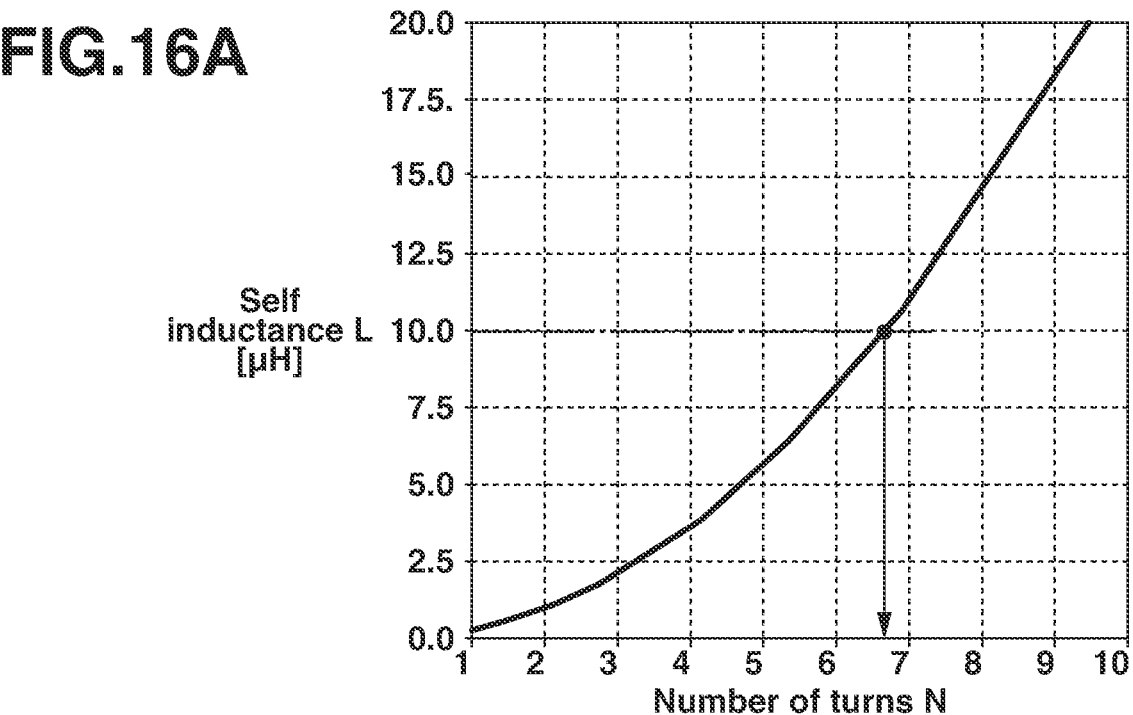
FIGS. 16A and 16B illustrate a self-inductance with respect to a number of turns of a solenoid coil according to one embodiment.
Figure 16B:
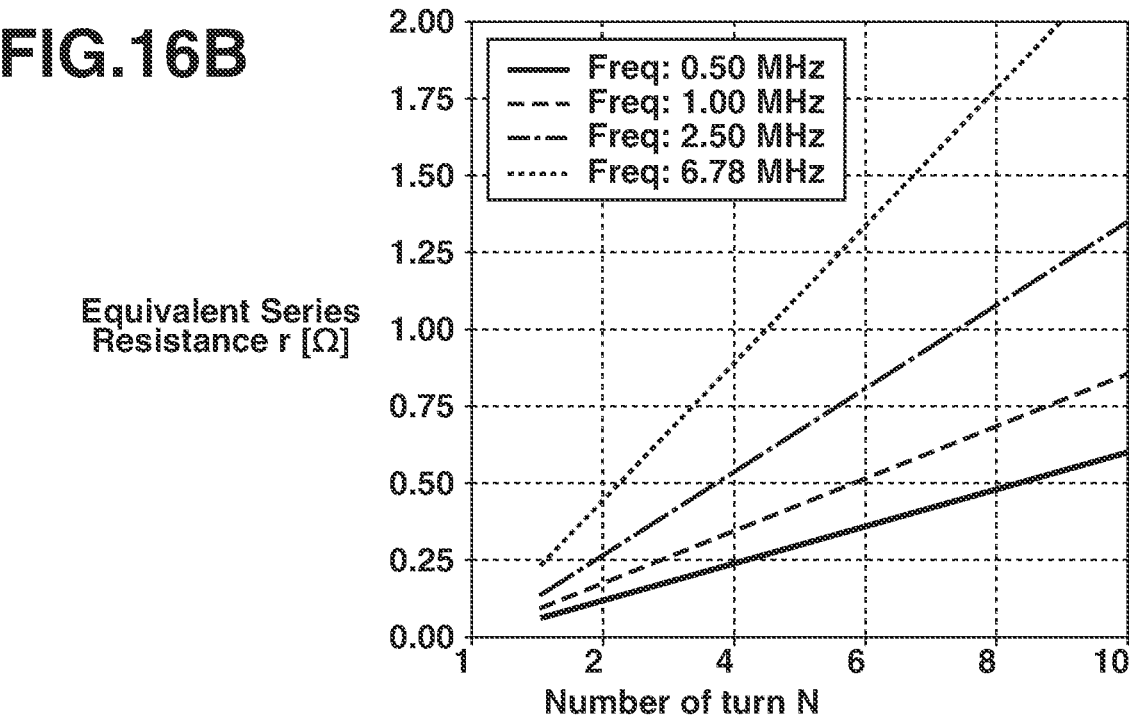

FIG. 16A illustrates a result of calculating the self-inductance with respect to changes in the number of turns N of the solenoid coil based on the formula (14). FIG. 16B illustrates a result of calculating the equivalent series resistance with respect to changes in the number of turns N of the solenoid coil based on the formula (19), using the switching frequency f as a parameter.

It is necessary that the self-resonant frequencies of the power transmission antenna 103 and the power reception antenna 104 of the wireless power transmission system 100 are sufficiently higher than the switching frequency f. According to the present exemplary embodiment, the maximal switching frequency f is 6.78 MHz. As a condition for operating the wireless power transmission system 100 at a switching frequency f of 6.78 MHz, the lower-limit values of the self-resonant frequencies of the power transmission antenna 103 and the power reception antenna 104 are defined as 10 MHz. If a parasitic capacitance that can be practically produced is approximately 25 pF, the self-inductance of the solenoid coil having a self-resonant frequency of 10 MHz is calculated as about 10 μH by formula (24):

$$L_{MAX} = \frac{1}{\omega^2 C} = \frac{1}{(2\pi \cdot f)^2 \cdot C} \approx 10 \ [\mu H] \quad (24)$$

The result illustrated in FIG. 16A demonstrates that, when the number of turns is about 7, the solenoid coil designed under the condition illustrated in FIG. 15 has an inductance of about 10 μH. Thus, according to the above-described consideration, the upper limit of the number of turns, $N_{max}$, is limited to 7.

Figure 17:
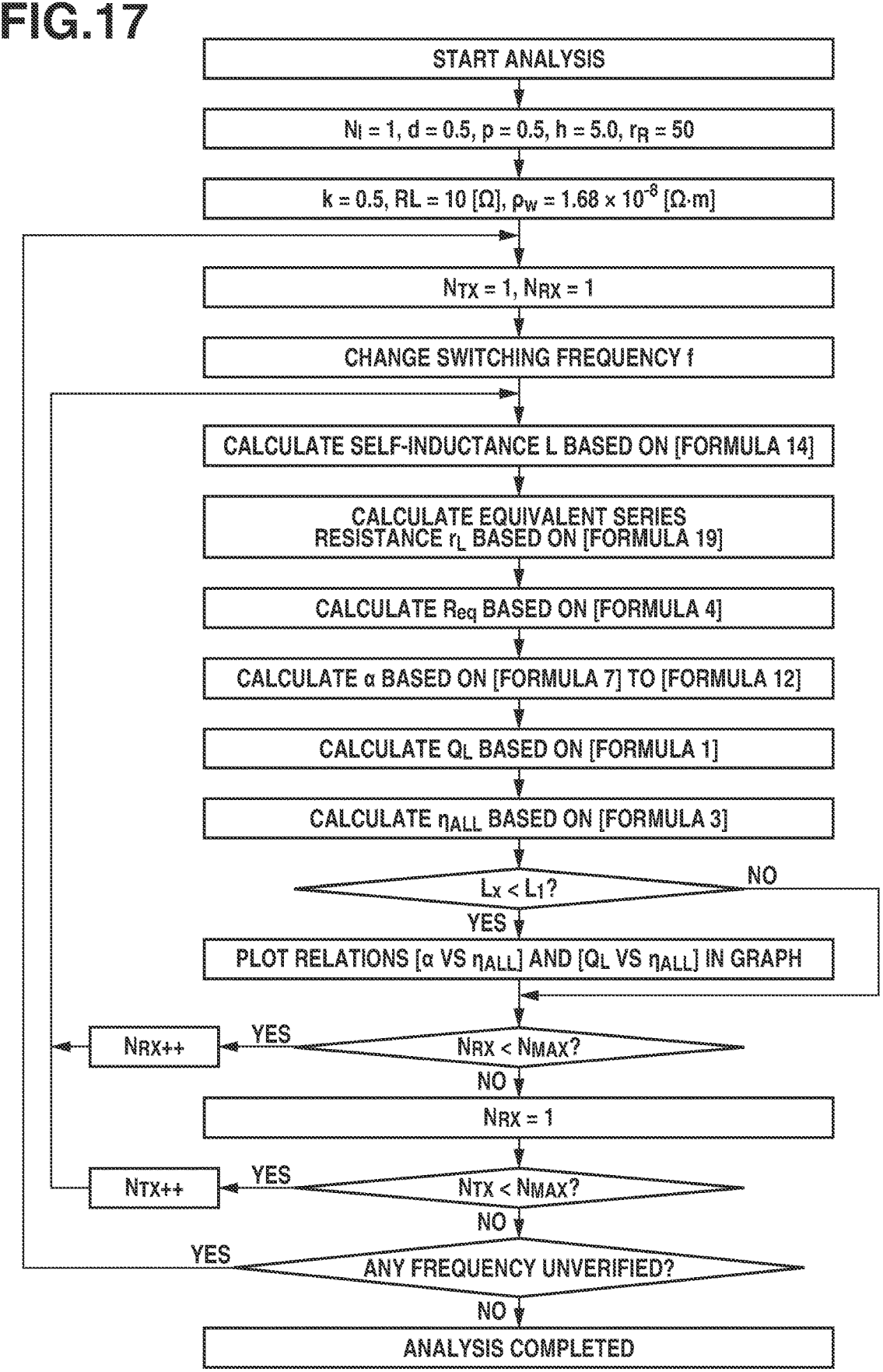
FIG. 17 is a flowchart for obtaining a relation between a total system efficiency and a according to one embodiment.

FIG. 17 is an analysis flowchart for obtaining a relation between the total system efficiency of the power transmission system 100 and α. The load 106 of the wireless power transmission system 100 is a 10-ohm resistor. The coupling coefficient for the power transmission antenna 103 and the power reception antenna 104 is 0.5.

Figure 18A:
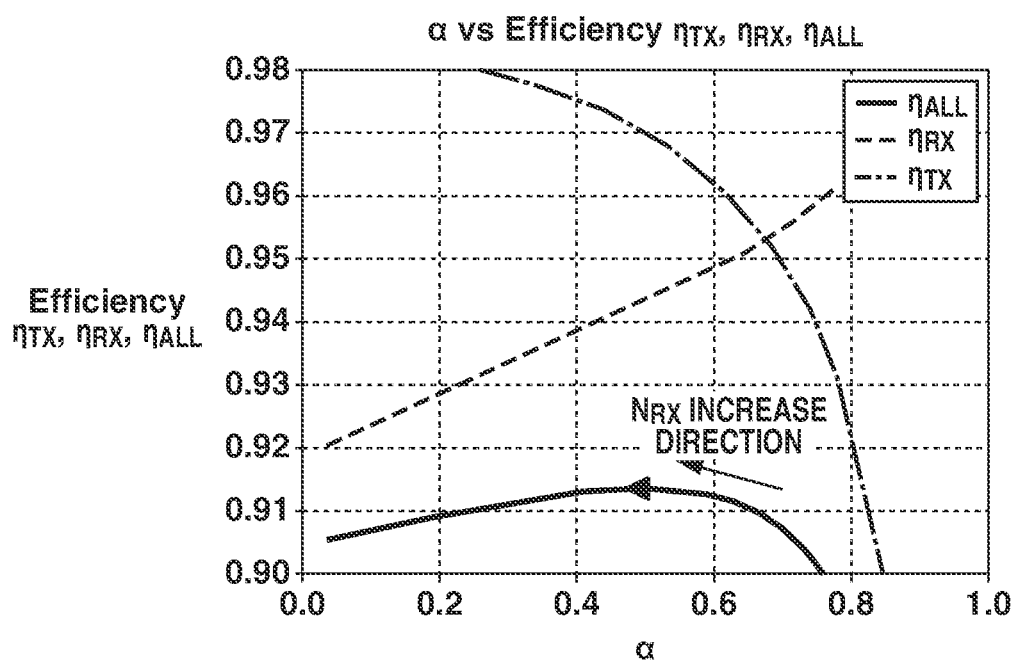
FIGS. 18A and 18B illustrate total system efficiencies according to one embodiment.
Figure 18B:
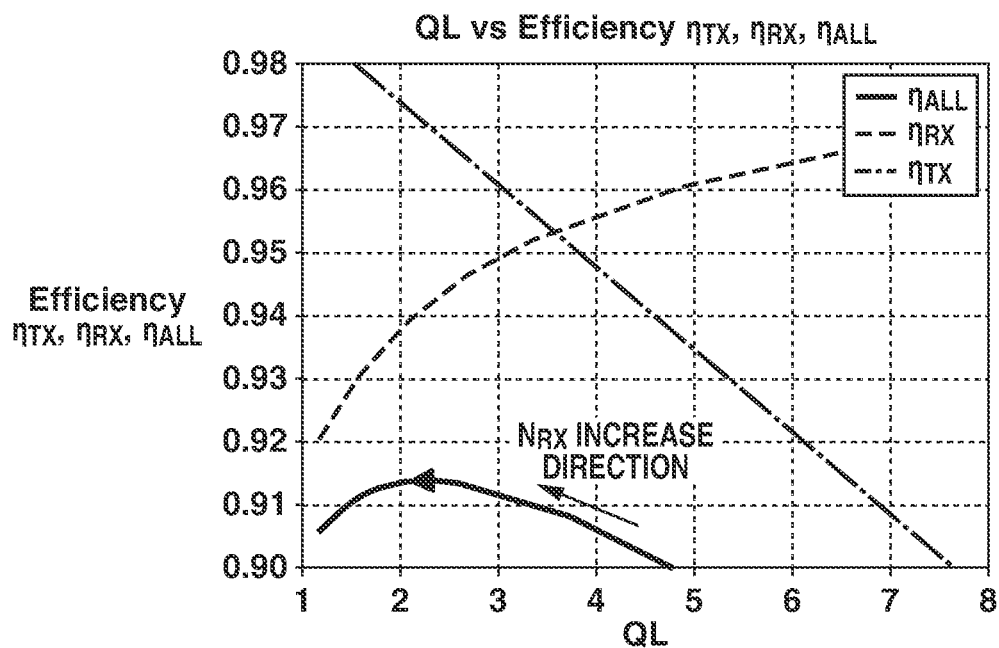

FIG. 18A illustrates an example of an analysis in which the winding was wound seven times for the power transmission antenna 103, and the switching frequency f was fixed to 2.5 MHz, according to the analysis flowchart illustrated in FIG. 17. Referring to FIGS. 18A and 18B, a number of turns, NRx, of the power reception antenna 104 increases in the direction from right to left.

Based on the result illustrated in FIG. 18A, the power conversion efficiency nix of the power transmission apparatus 107 monotonically increases with decreasing α. On the other hand, a power conversion efficiency $\eta_{RX}$ of the power reception apparatus 108 monotonically decreases with decreasing α. The total system efficiency $\eta_{ALL}$ of the wireless power transmission system 100 is represented by a product of the power conversion efficiency $\eta_{RX}$ of the power reception apparatus 108 and the power conversion efficiency $\eta_{TX}$ of the power transmission apparatus 107. Therefore, with a certain α, the total system efficiency $\eta_{ALL}$ of the wireless power transmission system 100 is maximized. The total system efficiency $\eta_{ALL}$ of the wireless power transmission system 100 is calculated by formula (3).

Figure 19A:
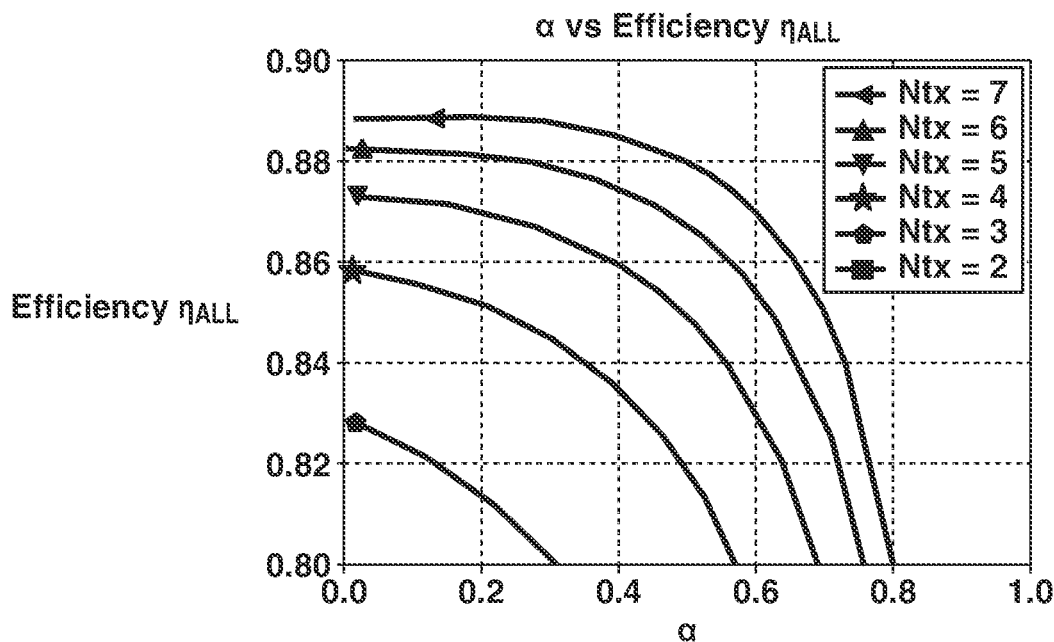
FIGS. 19A and 19B illustrate total system efficiencies according to one embodiment.
Figure 19B:
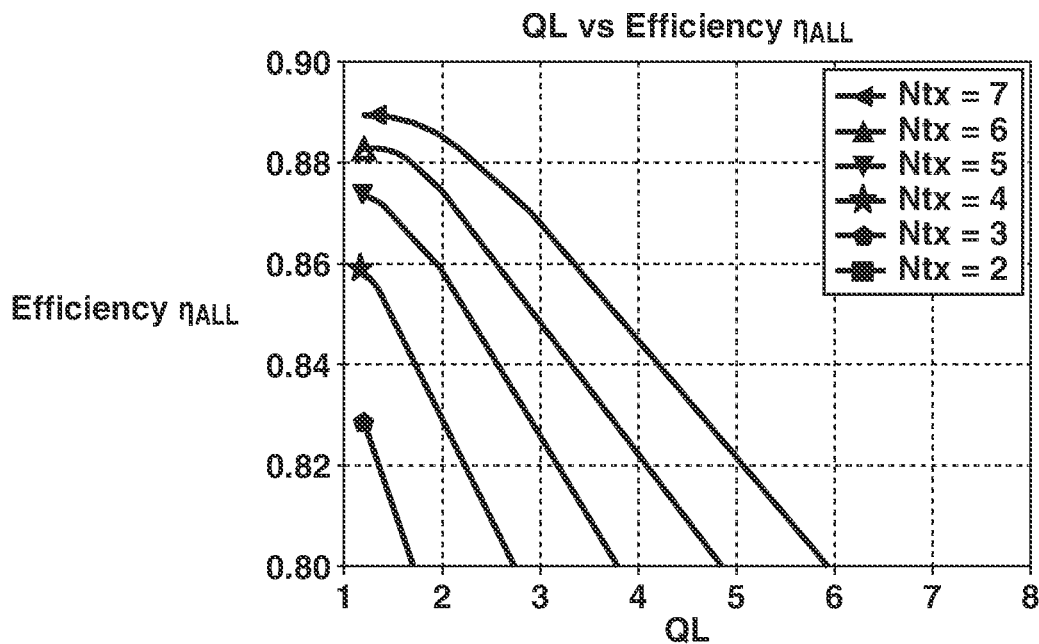

FIG. 19A illustrates a result of analyzing a relation between the total system efficiency $\eta_{ALL}$ of the wireless power transmission system 100 and a. In the analysis, the switching frequency f was set to 0.5 MHz, and the number of turns for the power transmission antenna 103 and the power reception antenna 104 is variably set to 1 to 7. At marker positions illustrated in FIG. 19A, the total system efficiency $\eta_{ALL}$ of the wireless power transmission system 100 is maximized. Likewise, FIG. 19B illustrates a result of analyzing a relation between the total system efficiency $\eta_{ALL}$ of the wireless power transmission system 100 and the narrowness $Q_L$ of the passband of the filter circuit 205 under the above-described condition. Considering these results, if design is based on α<0.13 ($Q_L$<1.33), the wireless power transmission system 100 having a switching frequency f of 0.5 MHz can provide a maximum total system efficiency $\eta_{ALL}$ under a plurality of antenna conditions.

Figure 20A:
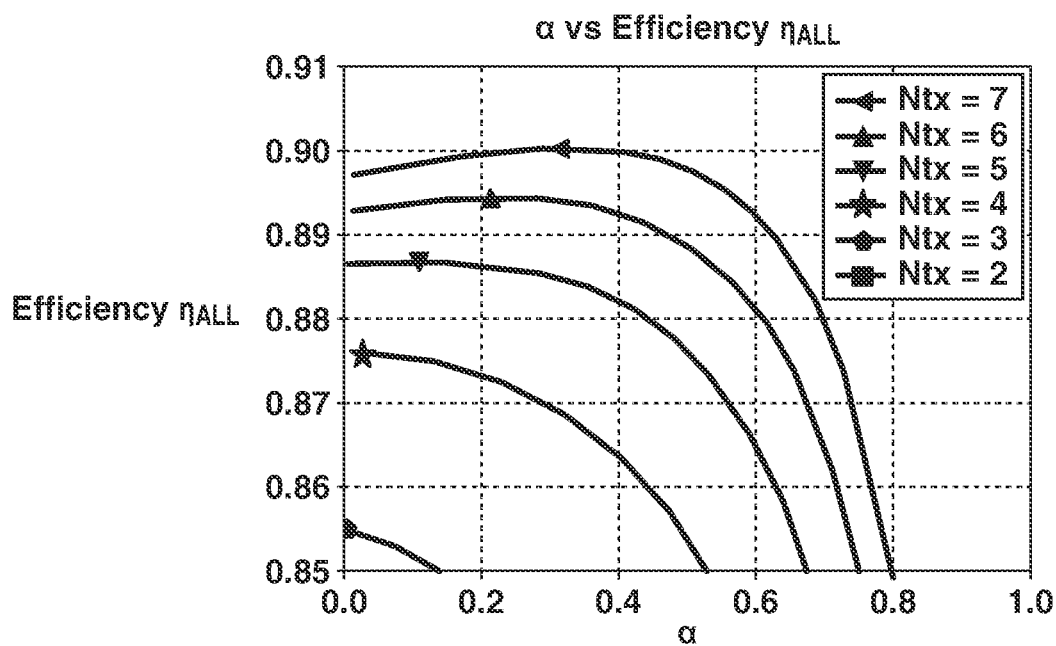
FIGS. 20A and 20B illustrate total system efficiencies according to one embodiment.
Figure 20B:
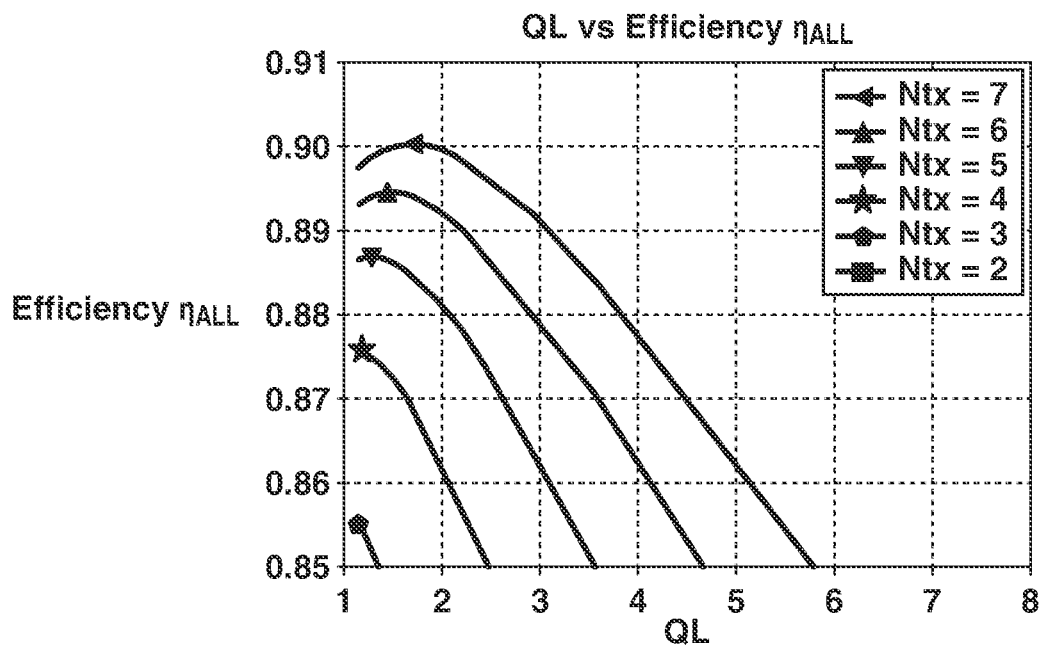

FIG. 20A illustrates a result of analyzing a relation between the total system efficiency $\eta_{ALL}$ of the wireless power transmission system 100 and α. In the analysis, the switching frequency f was set to 1.0 MHz, and the number of turns for the power transmission antenna 103 and the power reception antenna 104 is variably set to 1 to 7. At marker positions illustrated in FIG. 20, the total system efficiency $\eta_{ALL}$ of the wireless power transmission system 100 is maximized. Likewise, FIG. 20B illustrates a result of analyzing a relation between the total system efficiency $r_{tALL}$ of the wireless power transmission system 100 and the narrowness $Q_L$ of the passband of the filter circuit 205 under the above-described condition. Considering these results, if design is based on α<0.32 ($Q_L$<1.69), the wireless power transmission system 100 having a switching frequency f of 1.0 MHz can provide a maximum total system efficiency $\eta_{ALL}$ under a plurality of antenna conditions.

Figure 21A:
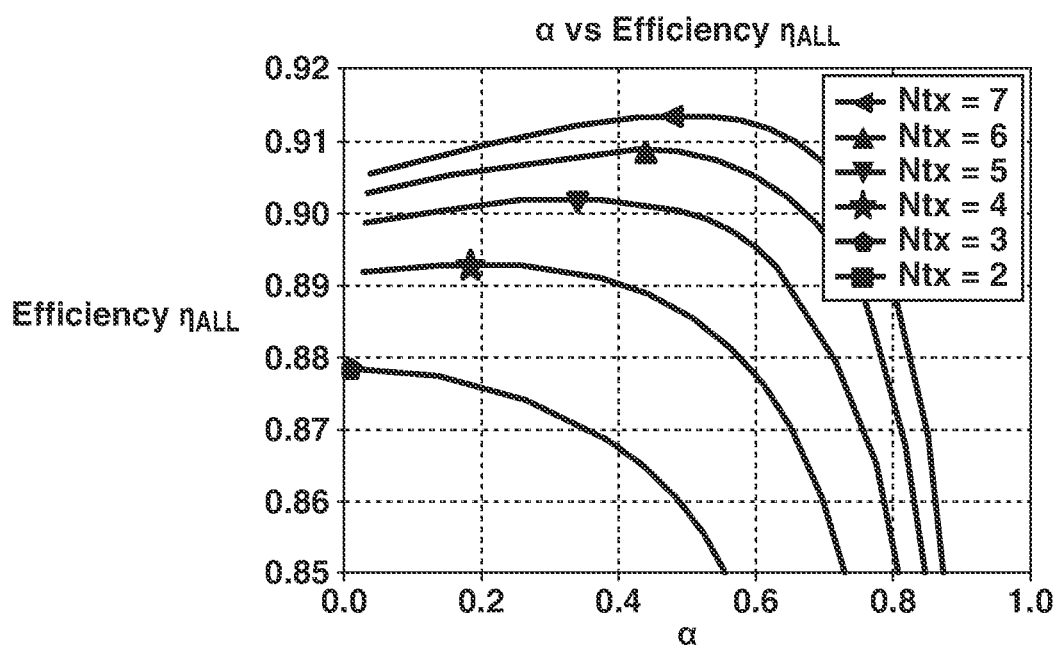
FIGS. 21A and 21B illustrate total system efficiencies according to one embodiment.
Figure 21B:
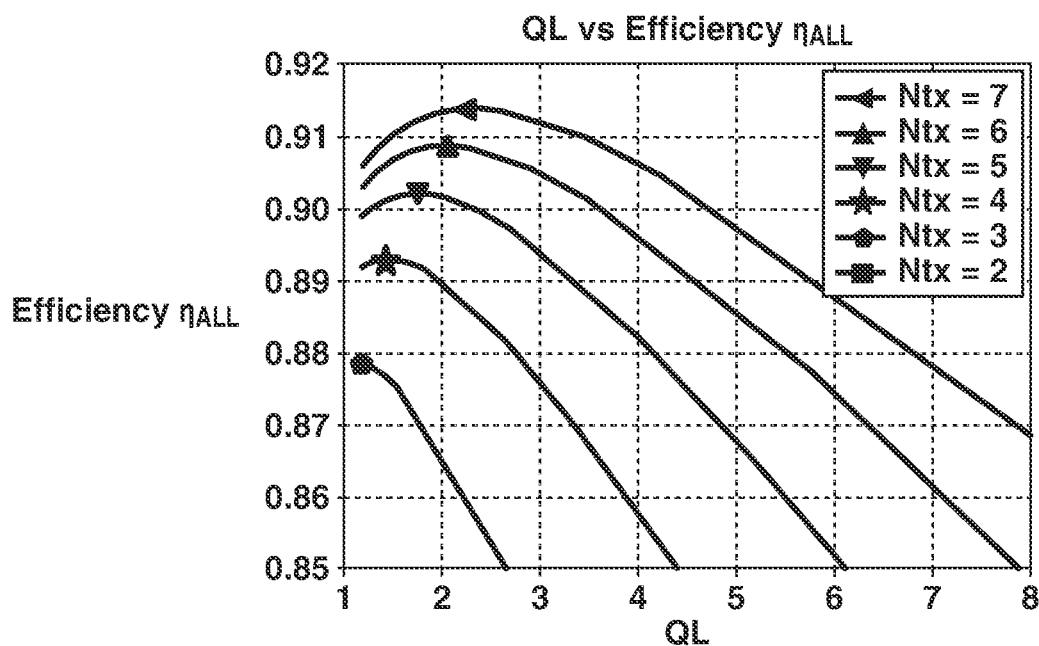

FIG. 21A illustrates a result of analyzing a relation between the total system efficiency of the wireless power transmission system 100 and a. In the analysis, the switching frequency f was set to 2.5 MHz, and the number of turns for the power transmission antenna 103 and the power reception antenna 104 is variably set to 1 to 7. At marker positions illustrated in FIG. 21A, the total system efficiency $\eta_{ALL}$ of the wireless power transmission system 100 is maximized. Likewise, FIG. 21B illustrates a result of analyzing a relation between the total system efficiency $\eta_{ALL}$ of the wireless power transmission system 100 and the narrowness $Q_L$ of the passband of the filter circuit 205 under the above-described condition. Considering these results, if design is based on α<0.49 ($Q_L$<2.24), the wireless power transmission system 100 having a switching frequency f of 2.5 MHz can provide a maximum total system efficiency $\eta_{ALL}$ under a plurality of antenna conditions.

Figure 22A:
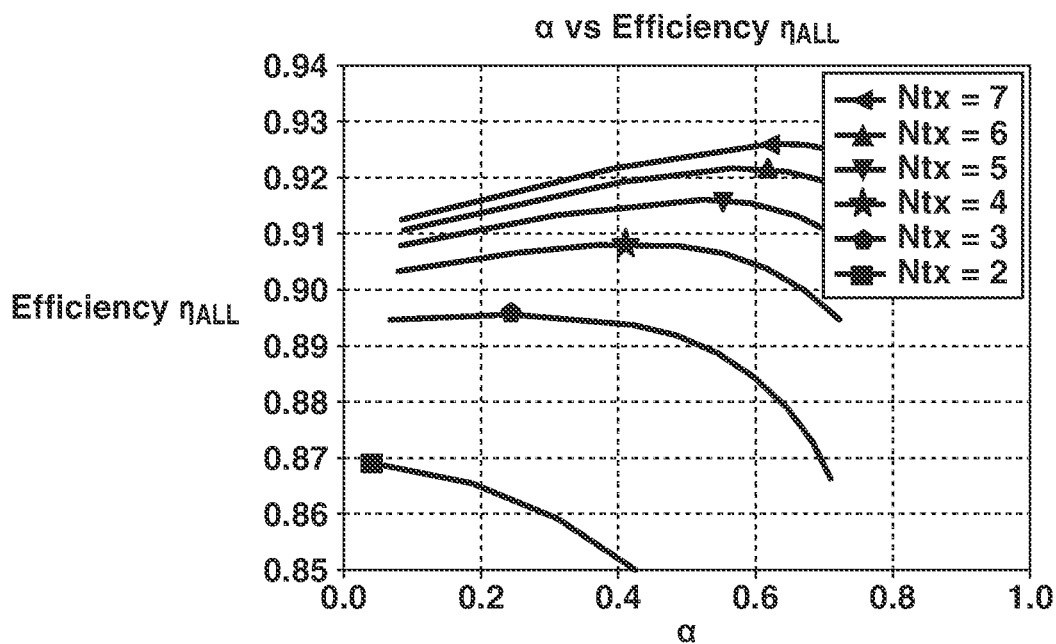
FIGS. 22A and 22B illustrate total system efficiencies according to one embodiment.
Figure 22B:
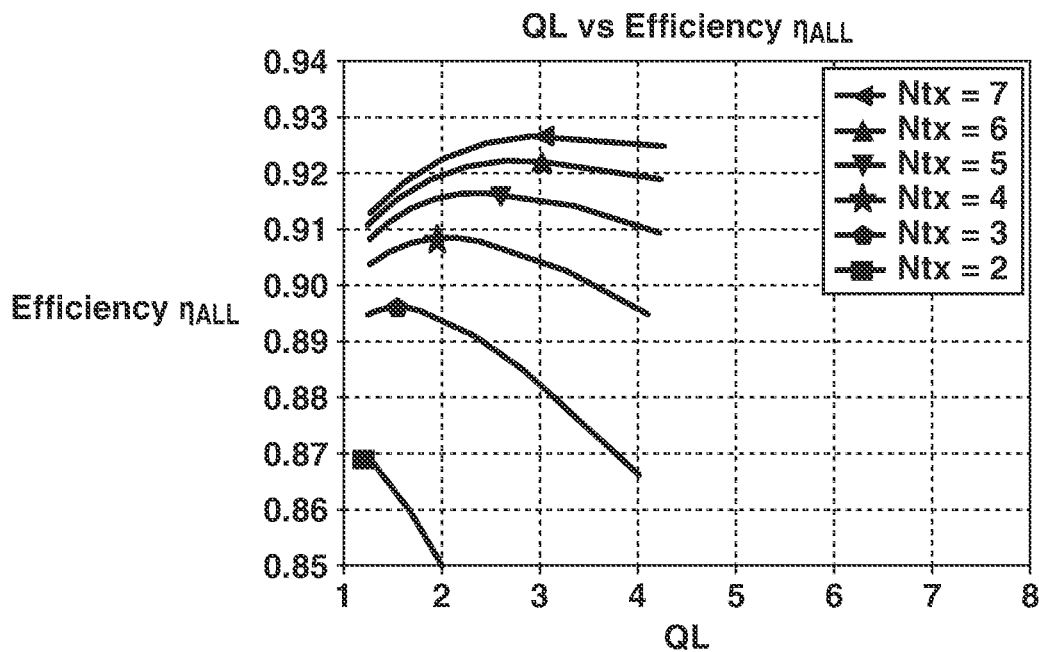

FIG. 22A illustrates a result of analyzing a relation between the total system efficiency $\eta_{ALL}$ of the wireless power transmission system 100 and α. In the analysis, the switching frequency f was set to 6.78 MHz, and the number of turns for the power transmission antenna 103 and the power reception antenna 104 is variably set to 1 to 7. At the marker positions illustrated in FIG. 22A, the total system efficiency $\eta_{ALL}$ of the wireless power transmission system 100 is maximized. Likewise, FIG. 22B illustrates a result of analyzing a relation between the total system efficiency $\eta_{ALL}$ of the wireless power transmission system 100 and the narrowness $Q_L$ of the passband of the filter circuit 205 under the above-described condition. Considering these results, if design is based on α<0.62 ($Q_L$<3.03), the wireless power transmission system 100 having a switching frequency f of 6.78 MHz can provide a maximum total system efficiency $\eta_{ALL}$, under a plurality of antenna conditions.

Figure 8:
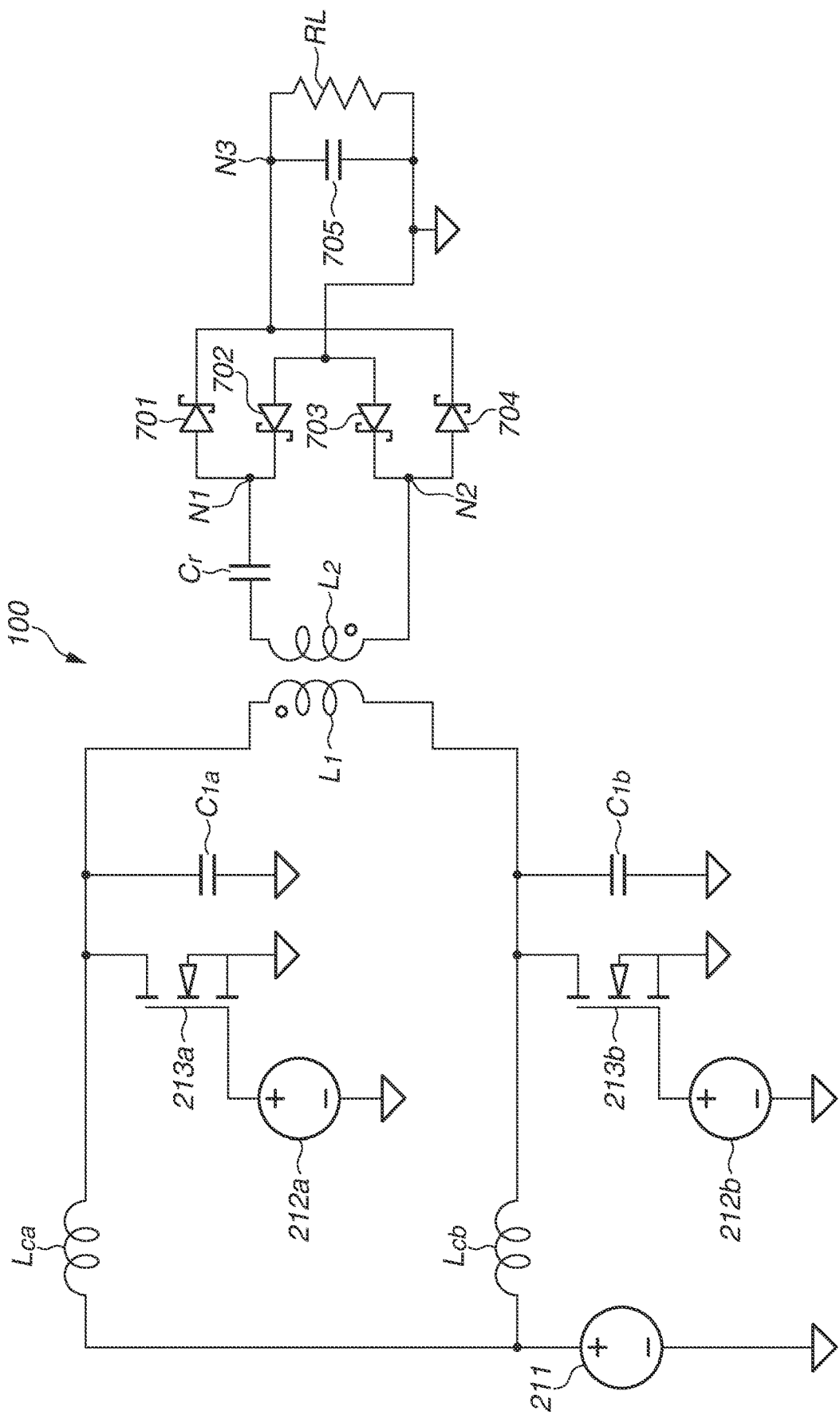
FIG. 8 is a circuit diagram illustrating an example of a configuration of a wireless power transmission system according to one embodiment.

FIG. 8 is a circuit diagram illustrating an example of a configuration of the wireless power transmission system 100 according to another exemplary embodiment. The wireless power transmission system 100 illustrated in FIG. 8 differs from the wireless power transmission system 100 illustrated in FIG. 7 in that inductors $L_{ca}$ and $L_{cb}$ are provided as a substitute for the inductor $L_c$. The wireless power transmission system 100 illustrated in FIG. 8 differs from the wireless power transmission system 100 illustrated in FIG. 7 in that switch control signal sources 212a and 212b are provided as a substitute for the switch control signal source 212. The wireless power transmission system 100 illustrated in FIG. 8 differs from the wireless power transmission system 100 illustrated in FIG. 7 in that switching elements 213a and 213b are provided as a substitute for the switching element 213. The wireless power transmission system 100 illustrated in FIG. 8 differs from the wireless power transmission system 100 illustrated in FIG. 7 in that capacitors $C_{1a}$ and $C_{1b}$ are provided as a substitute for the capacitor $C_1$. The present exemplary embodiment is, in general, referred to as a push-pull circuit configuration. The wireless power transmission system 100 illustrated in FIG. 8 is capable of outputting power that is four times the power of the wireless power transmission system 100 illustrated in FIG. 7 in a case of a same DC input voltage and load, and also obtaining an effect of restricting even-order harmonic distortion. Differences of the wireless power transmission system 100 illustrated in FIG. 8 from the wireless power transmission system 100 illustrated in FIG. 7 will be described below.

The negative terminal of the DC power source 211 is connected to the reference potential node. Negative terminals of the switch control signal sources 212a and 212b are connected to the reference potential node. The switching elements 213a and 213b are, for example, FETs.

The inductor $L_{ca}$ is connected between the positive terminal of the DC power source 211 and a drain terminal of the switching element 213a. The switch control signal source 212a connected to the gate terminal of the switching element 213a supplies a switch control signal (pulse signals) to the switching element 213a. A source terminal of the switching element 213a is connected to the reference potential node. The capacitor $C_{1a}$ is connected between the drain terminal and the source terminal of the switching element 213a. A first terminal of the inductor $L_1$ is connected to the drain terminal of the switching element 213a on a DC basis.

The inductor $L_{cb}$ is connected between the positive terminal of the DC power source 211 and a drain terminal of the switching element 213b. The switch control signal source 212b connected to the gate terminal of the switching element 213b supplies a switch control signal (pulse signals) to the switching element 213b. The switch control signal supplied by the switch control signal source 212b is different in phase from the switch control signal supplied by the switch control signal source 212a. A source terminal of the switching element 213b is connected to the reference potential node. The capacitor $C_{1b}$ is connected between the drain terminal and the source terminal of the switching element 213b. A second terminal of the inductor $L_1$ is connected to the drain terminal of the switching element 213b on a DC basis.

The switching elements 213a and 213b alternately turn ON to convert the DC power into AC power and supply the AC power to the inductor $L_1$.

The drain terminal of the switching element 213a is connected to the first terminal of the inductor $L_1$ on a DC basis. The drain terminal of the switching element 213b is connected to the second terminal of the inductor $L_1$ on a DC basis. In the wireless power transmission system 100, removing the capacitor $C_2$ illustrated in FIG. 3 can reduce the size and cost of the wireless power transmission system 100.

Figure 9:
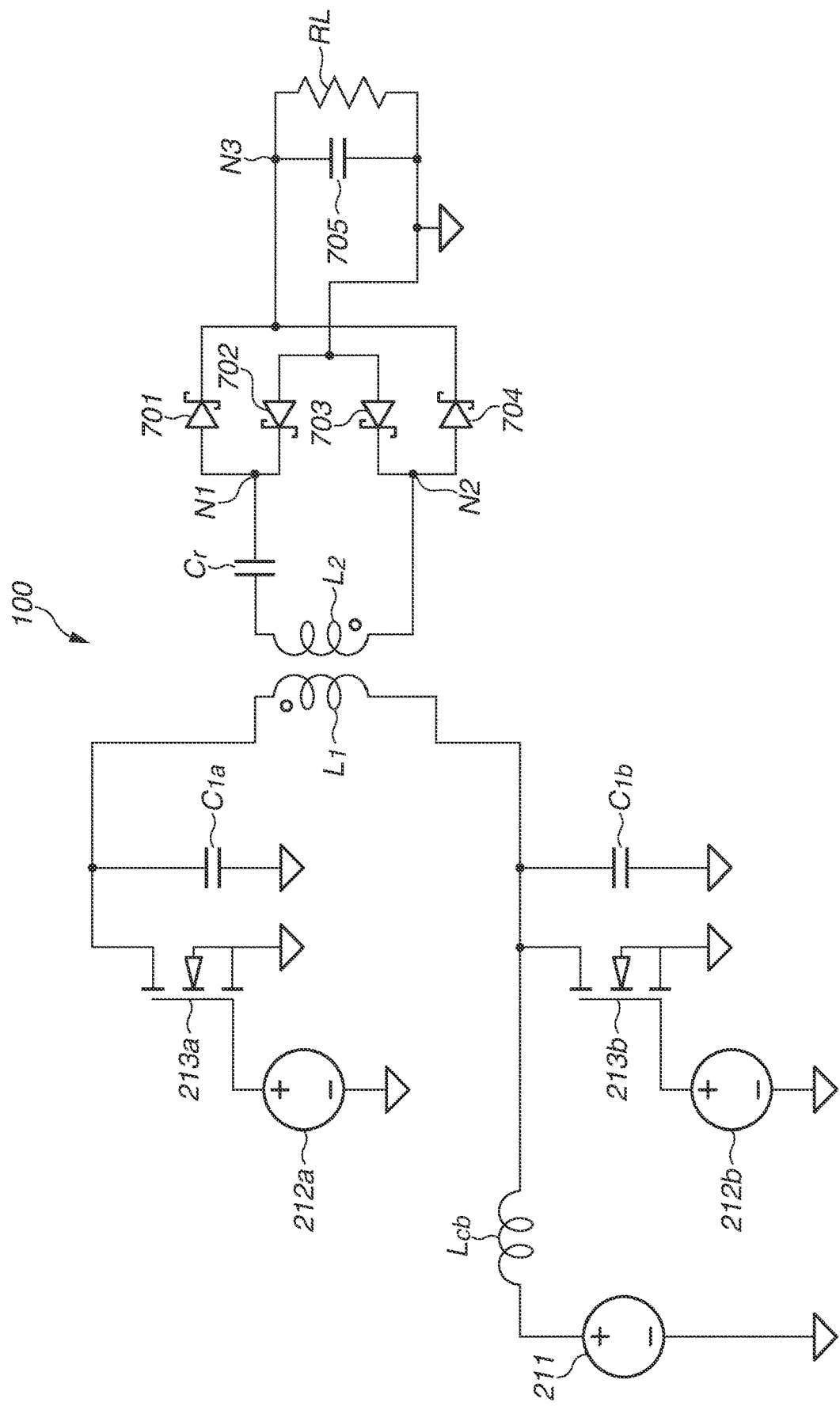
FIG. 9 is a circuit diagram illustrating an example of a configuration of a wireless power transmission system according to one embodiment.

FIG. 9 is a circuit diagram illustrating an example of a configuration of the wireless power transmission system 100 according to yet another exemplary embodiment. The wireless power transmission system 100 illustrated in FIG. 9 differs from the wireless power transmission system 100 illustrated in FIG. 8 in that the inductor $L_{ca}$ is removed. The drain terminal of the switching element 213a is not connected to the positive terminal of the DC power source 211 via the inductor $L_{ca}$. The DC power source 211 and the inductor $L_{cb}$ are connected in series with the drain terminal of the switching element 213b. The wireless power transmission system 100 illustrated in FIG. 9 performs a similar operation to the wireless power transmission system 100 illustrated in FIG. 8, and thus obtaining a similar effect.

Figure 10:
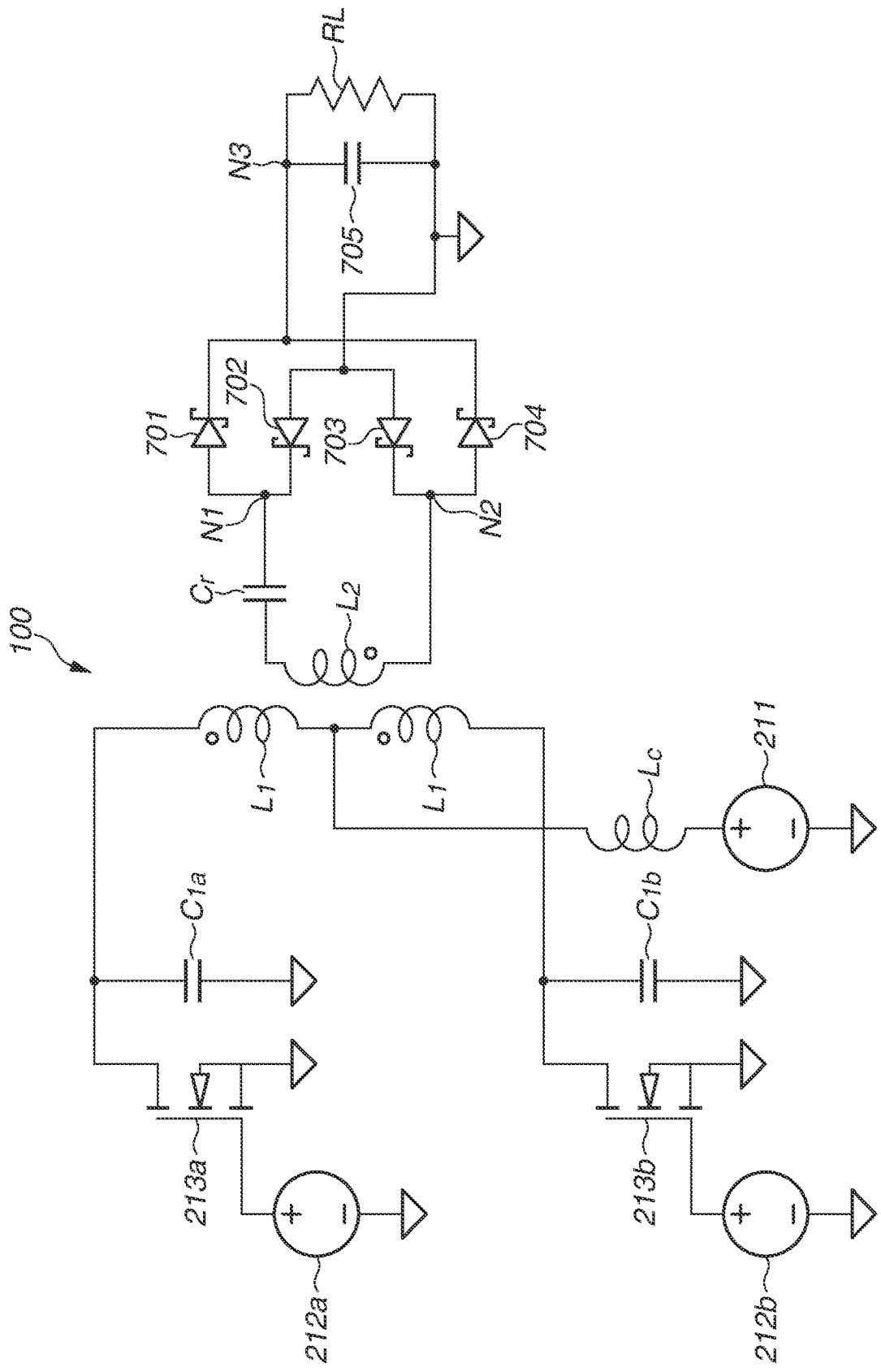
FIG. 10 is a circuit diagram illustrating an example of a configuration of a wireless power transmission system according to one embodiment.

FIG. 10 is a circuit diagram illustrating an example of a configuration of the wireless power transmission system 100 according to yet another exemplary embodiment. The wireless power transmission system 100 illustrated in FIG. 10 differs from the wireless power transmission system 100 illustrated in FIG. 8 in that an inductor $L_c$ is provided as a substitute for the inductors $L_{ca}$ and $L_{ab}$. Differences of the wireless power transmission system 100 illustrated in FIG. 10 from the wireless power transmission system 100 illustrated in FIG. 8 will be described below.

The inductor $L_1$ has a first terminal, a center tap, and a second terminal. The first terminal of the inductor $L_1$ is connected to the drain terminal of the switching element 213a. The second terminal of the inductor $L_1$ is connected to the drain terminal of the switching element 213b. The center tap of the inductor $L_1$ is connected to the positive terminal of the DC power source 211 via the inductor L. The inductor Le and the DC power source 211 are connected in series with the center tap of the inductor $L_1$. The negative terminal of the DC power source 211 is connected to the reference potential node. The wireless power transmission system 100 illustrated in FIG. 10 performs a similar operation to the wireless power transmission system 100 illustrated in FIG. 8, and thus obtaining a similar effect.

The inductors $L_{ea}$ and $L_{cb}$ used in the wireless power transmission system 100 illustrated in FIG. 8 are, in general, large-sized parts. Thus, integrating these inductors into one inductor is very advantageous from a viewpoint of miniaturization.

The wireless power transmission system 100 according to the present exemplary embodiment may be mounted on a non-contact portion of a rotating movable member of a robot arm. The wireless power transmission system 100 according to the present exemplary embodiment may also be mounted on a non-contact portion of a rotating movable member of a network camera. The wireless power transmission system 100 according to the present exemplary embodiment may also be mounted on a non-contact portion of a translation member of an actuator. The wireless power transmission system 100 according to the present exemplary embodiment may also be mounted on a non-contact portion of a reticle movable member of a semiconductor exposure apparatus. The wireless power transmission system 100 according to the present exemplary embodiment may also be mounted on a non-contact portion between a vehicle apparatus and a charging apparatus. The wireless power transmission system 100 according to the present exemplary embodiment may also be mounted on a non-contact portion between a drone and a ground power source.

The above-described exemplary embodiments are to be considered as illustrative in embodying various embodiments of the present disclosure, and are not to be interpreted as restrictive of the technical scope of the present invention. The present invention may be embodied in diverse forms without departing from the technical concepts or essential characteristics thereof.

The above-described exemplary embodiments make it possible to implement high efficiency, spacing saving, and cost reduction in a wireless power transmission system, for example.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-186618, filed Oct. 10, 2019, which is hereby incorporated by reference herein in its entirety.

What is claimed is:

1. A power transmission apparatus comprising:
   a first switching element having a first terminal and a second terminal;
   a first capacitor having a third terminal connected to the first terminal and a fourth terminal connected to the second terminal;
   a power transmission inductor connected to the first switching element and configured to wirelessly transmit AC power; and
   a second capacitor connected between the first terminal and the power transmission inductor,
   wherein an impedance $Z_c$ of the second capacitor at a switching frequency ω of the first switching element is smaller than an impedance $Z_L$ of the power transmission inductor at the switching frequency f and $Z_c/Z_L$ satisfies $Z_c/Z_L<0.62$.

2. The power transmission apparatus according to claim 1, wherein a quality factor $Q_L$ of a filter circuit formed by the power transmission inductor and the second capacitor satisfies $Q_L<3.03$ at the switching frequency ω.

3. The power transmission apparatus according to claim 1, wherein, at a timing when the first switching element changes from an OFF state to an ON state, a potential difference between the first terminal and the second terminal is approximately zero.

4. The power transmission apparatus according to claim 1, wherein the power transmission inductor transmits AC power wirelessly to a power reception apparatus, and the power reception apparatus comprises:
   a power reception inductor magnetically coupled to the power transmission inductor;
   a third capacitor resonating with the power reception inductor at the switching frequency f; and
   a load RL,
   wherein a quality factor $Q_L$ formed by
   an equivalent impedance $R_{eq}$ of the power reception apparatus equivalently connected in series to the power transmission inductor,
   a series resistance value $r_{L1}$ of the power transmission inductor,
   an inductance value $L_1$ of the power transmission inductor and
   an angular frequency ω at the switching frequency f satisfies $$Q_L = \frac{\omega L_1}{R_{eq} + rL_1} < 3.03.$$

5. The power transmission apparatus according to claim 4, wherein the equivalent impedance $R_{eq}$ of the power reception apparatus comprises:
   the inductance value $L_1$ of the power transmission inductor,
   the load RL,
   the angular frequency ω at the switching frequency f,
   an inductance value $L_2$ of the power reception inductor,
   a series resistance value $r_{L2}$ of the power reception inductor and
   a coupling factor K between the power transmission inductor and the power reception inductor.

* * * * *